US012380512B2

(12) United States Patent
Palanisamy Vesalakshi Sathyamurthi et al.

(10) Patent No.: US 12,380,512 B2
(45) Date of Patent: Aug. 5, 2025

(54) SYSTEMS AND METHODS FOR IMPROVED PAYROLL ADMINISTRATION IN A FREELANCE WORKFORCE

(71) Applicant: Cast & Crew Payroll LLC, Burbank, CA (US)

(72) Inventors: Ravishankar Palanisamy Vesalakshi Sathyamurthi, Little Rock, AR (US); Shahid Mustafa, Valencia, CA (US); Guillaume Remi Aubuchon, Milan, OH (US); Partha Sarathi Maharatha, Valencia, CA (US); Charles Andrew Patterson, Studio City, CA (US); Ross David Agre, Durango, CO (US)

(73) Assignee: Cast & Crew Payroll LLC, Burbank, CA (US)

( * ) Notice: Subject to any disclaimer, the term of this patent is extended or adjusted under 35 U.S.C. 154(b) by 298 days.

(21) Appl. No.: 17/901,768

(22) Filed: Sep. 1, 2022

(65) Prior Publication Data
US 2023/0081511 A1 Mar. 16, 2023

Related U.S. Application Data

(60) Provisional application No. 63/242,910, filed on Sep. 10, 2021.

(51) Int. Cl.
*G06Q 40/12* (2023.01)
*G06V 30/10* (2022.01)
*G06V 30/412* (2022.01)

(52) U.S. Cl.
CPC ........... *G06Q 40/125* (2013.12); *G06V 30/10* (2022.01); *G06V 30/412* (2022.01)

(58) Field of Classification Search
CPC ..... G06Q 40/125; G06V 30/10; G06V 30/412
See application file for complete search history.

(56) References Cited

U.S. PATENT DOCUMENTS 7,296,221 B1 * 11/2007 Treibach-Heck .... G06Q 20/203
715/224
8,320,656 B1 11/2012 Bhatt
(Continued)

OTHER PUBLICATIONS

ISA/US, "Notification of Transmittal of the ISR and the Written Opinion of the International Searching Authority, or the Declaration," in PCT Application No. PCT/US2022/042549, Dec. 8, 2022, 6 pages.

*Primary Examiner* — Stephen R Koziol
*Assistant Examiner* — Michael Kim Maiden
(74) *Attorney, Agent, or Firm* — Daniel Maffeo

(57) ABSTRACT

Systems and methods for improved payroll management in a freelance driven industry is provided. Payroll documents may be uploaded through a web portal to the payroll management system as a digital image. The document is then split into individual pages, each page representing a "form", and subjected to optical character recognition (OCR) to generate a machine readable document, which are then matched to one of many possible form types. This matching may rely upon keyword disambiguation and/or machine learning classifications. Data is extracted from the form using a coordinate identification system. The forms may be reconstituted as standardized forms. These standardized forms are then stitched together into packets by user, by employing logic. The hourly gross compensation for the user is calculated, responsive to constraints collected from many sources (including contractual constraints, statutory constraints, and union imposed constraints).

20 Claims, 25 Drawing Sheets

(56) References Cited

U.S. PATENT DOCUMENTS

| | | | |
|---|---|---|---|
| 9,116,890 B2* | 8/2015 | King | G06F 16/41 |
| 2003/0046135 A1 | 3/2003 | Cartwright et al. | |
| 2003/0083966 A1 | 5/2003 | Treibach-Heck et al. | |
| 2003/0084402 A1* | 5/2003 | Treibach-Heck | G06Q 10/087 |
| | | | 715/230 |
| 2004/0267595 A1* | 12/2004 | Woodings | G06Q 10/063112 |
| | | | 705/7.14 |
| 2020/0286616 A1* | 9/2020 | Dunn | G06N 5/046 |

* cited by examiner

SYSTEMS AND METHODS FOR IMPROVED PAYROLL ADMINISTRATION IN A FREELANCE WORKFORCE

CROSS REFERENCE TO RELATED APPLICATION

This non-provisional U.S. application claims the benefit and priority of U.S. Provisional Application No. 63/242,910, filed Sep. 10, 2021, which is incorporated by reference herein for all purposes.

BACKGROUND

The present invention relates in general to the field of payroll management, and more specifically to a computer program and systems for providing payroll information to a client within a highly unionized and freelance based workforce. Such systems and methods are useful to enable accurate and automated payments to workers in fields where traditional payment platforms are unavailable or severely lacking in functionality.

Many industries rely upon non-traditional workforces. The entertainment production industry, for example, relies upon many freelance workers. These workers' employment is impacted by union rules, statutory requirements that vary by region, and contract requirements that are also often in flux. This myriad of rules and regulations pose a significant hurdle to effectively calculating payroll for these individuals—requiring significant manual review of the timecards in light of the complex and shifting sets of rules.

Further, even the timecards used may vary between industry verticals (e.g., film and television versus commercials), individuals, projects, union memberships and the like. This lack of consistency of the basic input also makes automation of processing any of the payroll activity for these kinds of workforces problematic, at best.

Between the inconsistent inputs, and vast and shifting rules that regulate the content of these inputs, the handling of the payroll of freelance driven industries is one of the most manually driven accounting activities. This has a cost to the employers: manual review is slow, and hourly costs for the reviewers increases the monetary burden on the employers. Additionally, it is far too easy for a manual reviewer to make a mistake, apply a rule inconsistently, or otherwise cause a miscalculation in the generation of the gross payment due the employee/freelancer. This kind of miscalculation is not without cost; there may be significant fines associated with underpayment of these employees, as well as reputational damage.

As such, the existing manual review and processing of payroll documents in a highly freelance driven industry is fraught with drawbacks. It is therefore apparent that an urgent need exists for systems and methods for improved means of payroll management in a highly regulated field where the payroll documents themselves are highly inconsistent. Such systems and methods are designed to provide increased payroll processing accuracy, through the dynamic and fault free application of hierarchical constraints upon the hours reported by an employee, and increased processing efficiency by minimizing the requirements for human interference.

SUMMARY

The present systems and methods relate to improving payroll processing in a freelance-centric and highly regulated industry. Such systems and methods enable improvements in processing speed and efficiency, as well as providing greater accuracy of payroll compensation calculations.

In some embodiments, a payroll document is ingested. The payroll documents may be uploaded through a web portal to the payroll management system as a digital image. The document may have more than one page. The document is then split into individual pages, each page representing a "form". The forms are subjected to optical character recognition (OCR) to generate a machine readable document. The resulting readable forms are then matched to one of many possible form types. This matching may rely upon keyword disambiguation and/or machine learning classifications.

After the form type is known, data can be extracted from the form using a coordinate identification system. Due to the form type being known, the layout of information on said form is also known. Thus the data extraction system can simply look at a set of known coordinates in the form to extract the relevant information. Additionally, keyword matching may also be employed to extract data from the OCR form.

Once the data has been extracted, the forms may be reconstituted as standardized forms. These standardized forms are then stitched together into packets by the system. The user's name is used to collect the forms together for the packet. In some embodiments, logic is employed to match names between the form documents.

Next the hourly gross compensation for the user is calculated, responsive to the packet. In order to do this calculation, constraints are collected from many sources, including contractual constraints, statutory constraints, and union imposed constraints. These constraints are all collated into a constraint table. After the constraints have been selected, they are applied, in a hierarchical manner, against the standardized timesheets in order to yield hourly compensation amounts, which are summed into the total compensation for the given user.

The gross compensation and standardized timesheets can then be provided to a payroll system for calculation of net compensation, fringe benefits, taxes and the like. The final amounts are provided to the client to actually effectuate the funds transfer.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
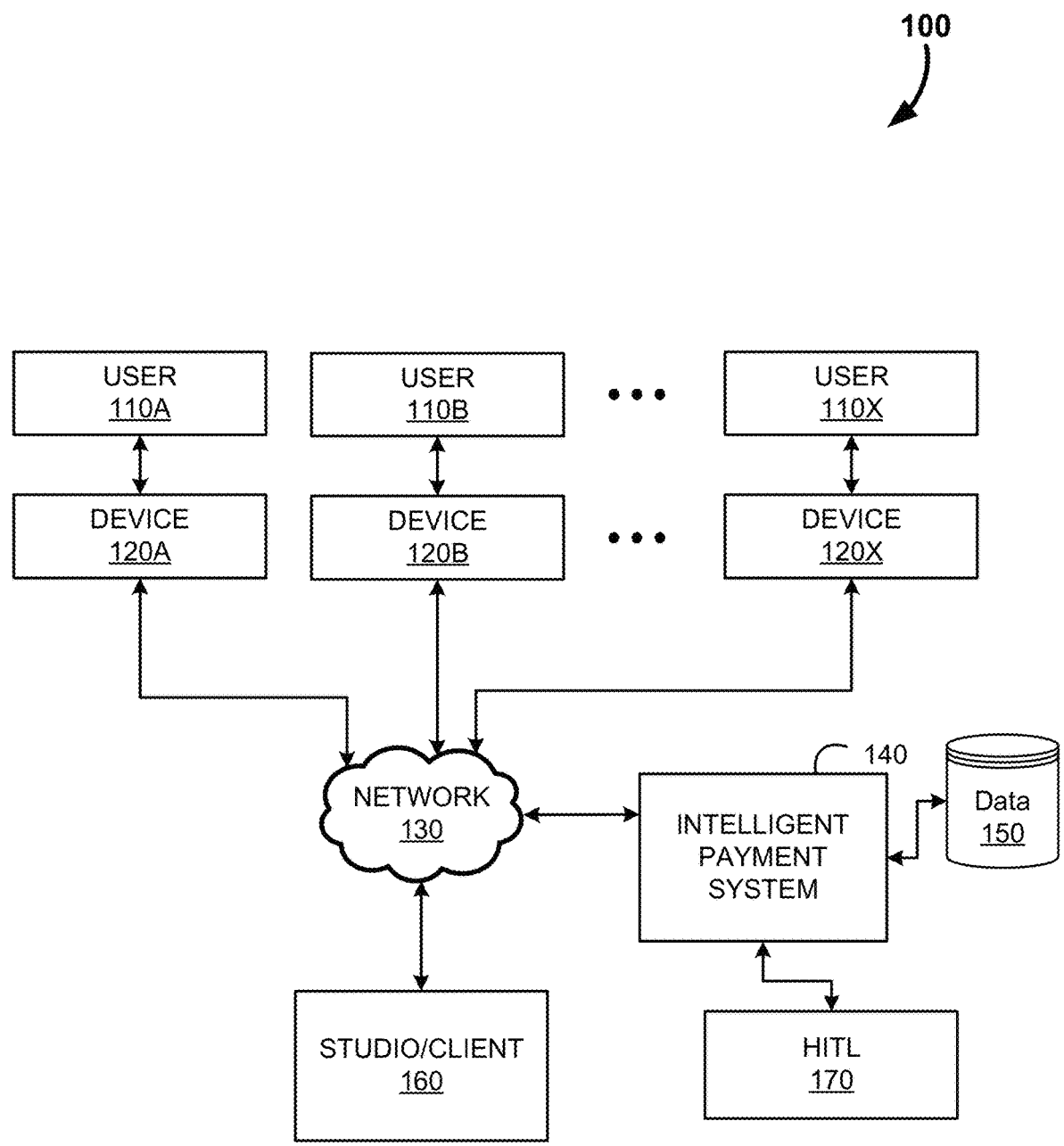
FIG. 1 is an example block diagram of a system for payroll management within a freelance dominated workforce, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to systems and methods for the management of payroll activity in an industry dominated by freelance workers, and a myriad of changing regulations and rules. A particularly salient example of such an industry includes the movie and television industry. In this field, many workers are unionized members, and work in a freelance capacity. This results in the timecards (or other work tracking documentation) to generally not be particularly standardized. Additionally, the work performed is subjected to a number of rules and regulations. These rules and regulations vary by time/day, geography, and prior working activity. These rules and regulations consist of many overlying rules that stem from statutory/governmental protections, contractual rules based upon project, and union rules.

In some embodiments, the following disclosure will focus upon the term "employee". This may be a bit of a misnomer, as many of the workers for which the system is intended to service are freelance workers. Regardless, the terms 'worker', 'employee', 'contractor', 'users' and 'freelancer' all refer to a worker who is engaging the following payroll management system for determining their wage/compensation.

Further, given the focus on the film industry in particular, the payor of the compensation/wages may be referred to as the 'studio' and/or 'production house'. This is not an attempt to be limiting, especially as the film industry evolves. For example, technology companies, such as Amazon and Apple, have increasingly ventured into the area of original content generation. Further, the present systems are not limited to the film industry. Indeed, the present payroll management systems are useful wherever a freelance workforce is typically employed, such as many trade groups working in refineries, shipping, and journalism for example. As such, and mention of 'studio', 'client' or 'producer' is intended to encompass any payor of the compensation involved.

To facilitate discussions, FIG. 1 is an example payroll management system, shown generally at 100. In this example system a set of users/workers 110a-x, access the intelligent payment system interface via a device 120a-x. These devices may include a large range of devices, including scanning devices, or photographic devices which are capable of taking a digitized image of a timecard or other time recording documentation. In some embodiments, these devices include a scanner coupled to a computer system. In other embodiments, the devices may include a standard smartphone capable of using the camera to capture an image of the timecard and/or other documentation, and transmitting it to the downstream systems.

Each user's devices are coupled to a backend intelligent payment system 2040 via a network 130. In most cases the network is comprised of a cellular network and/or the internet. However, it is envisioned that the network includes any wide area network (WAN) architecture, including private WAN's, or private local area networks (LANs) in conjunction with private or public WANs. The intelligent payment system 140 has access to data stores 150 to effectuate the system's operations. Additionally, the intelligent payment system 140 has access to a network of humans in the loop (HITL) 170, either directly, or via the network 130.

After payment information is processed by the intelligent payment system 140, the client 160 may be provides the results (again through the network) in order to effectuate the actual payments. Payments may include the client 160 issuing checks to the users 110a-x, or via other suitable fund transfer (electronic wire, direct deposit, etc.).

Figure 2:
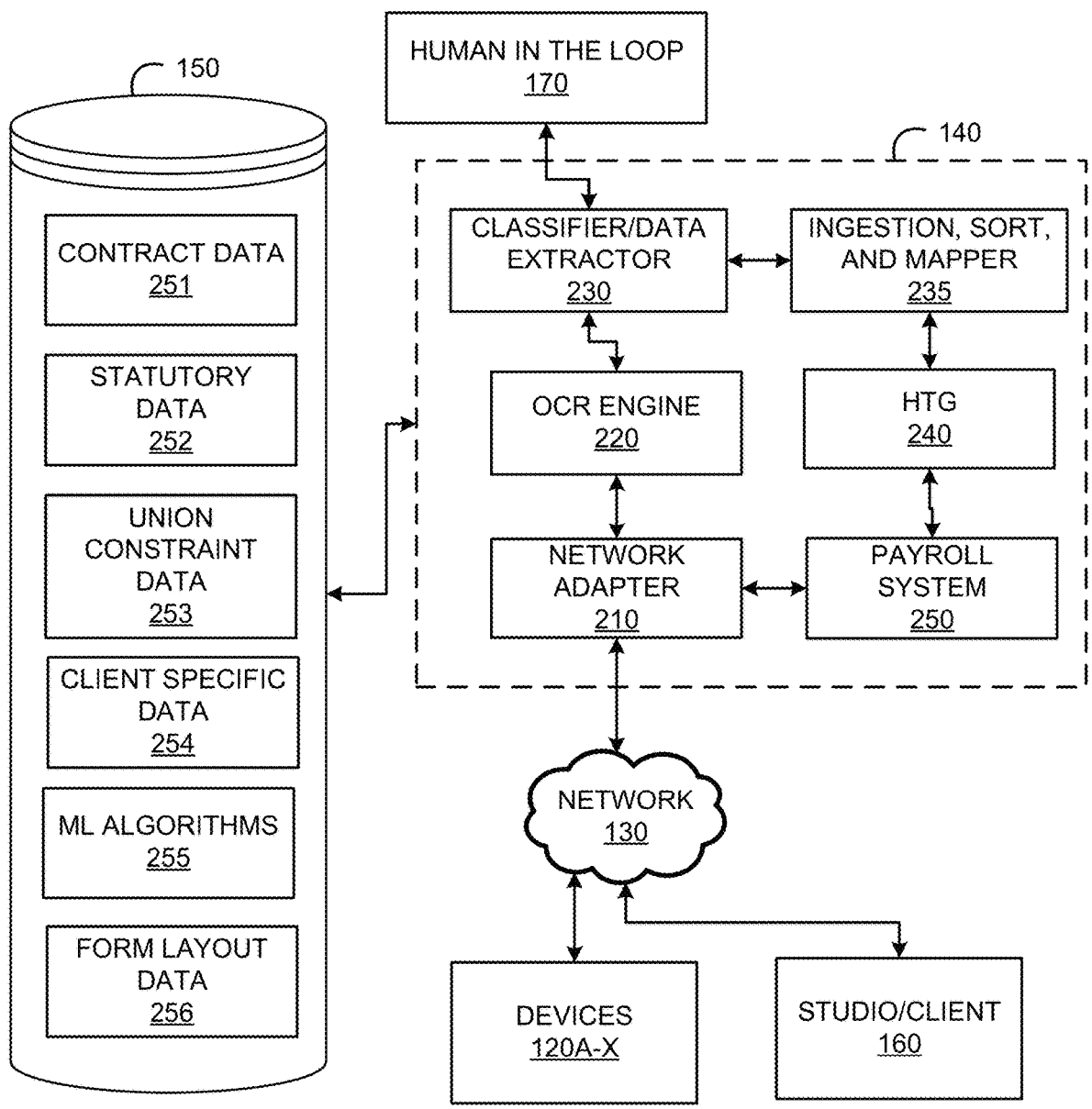
FIG. 2 is an example block diagram showing the intelligent payment system, in accordance with some embodiment.

Turning to FIG. 2, a more detailed view of the intelligent payment system 140 is provided. Again, we see the devices 120a-x of the users, the client 160 and the intelligent payment system 140 being coupled by the network 130. The data store has been expanded to illustrate the kinds of data being managed and retained. The data store includes data related to the contracts employed 251. These contract provisions may be maintained in table formats and are referenced by project. Statutory data 252 may be organized by jurisdiction. Union constraints 253 may be cross referenced by union type as well as geography. Different clients may also have specific constraints 254. Machine learning models 255 that are employed in the classification of documents, in some embodiments, are likewise housed within the data store. Lastly, form layouts and associated data 256 are retained for consumption by the intelligent payment system 140.

The following descriptions of the intelligent payment system 140 will focus upon various logical components. These components, while described individually, may be physically embodied within the same architecture. The description of these logical elements independently does not, in any way, limit the scope of this disclosure. Furthermore, in some embodiments, fewer than the described components of the intelligent payment system 140 may be required to make a functional system. For example, the payroll element for final calculations of fringe benefits and the like, may be excluded from the intelligent payment system 140 if the client would prefer to make such calculation.

Likewise, natural extensions of the proposed system elements are also considered within the scope of the disclosure, even when not explicitly mentioned. For example, it can easily be seen that the payroll element may be conducive to employ some machine learning predictive algorithms to assist the client in managing future costs, or some benchmarking module so that the client can compare their costs to other studios. Even if such natural extensions are not explicitly disclosed herein, the invention is not artificially limited to only the specifically enumerated components.

Returning to the figure, the intelligent payment system 140 includes a network adapter 210, which facilitates communication between the network 130 and the internal subsystems of the intelligent payment system 140. When a new timesheet/document package is provided by the user (via their device over the network), the system ingests this document and presents it to the optical character recognition (OCR) engine 220. OCR is a well understood concept, and any of the prior OCR methodologies are contemplated as being utilized by the OCR engine 220. The OCR engine converts the image of the documentation into a machine-readable rendering. This output can be supplied to the classifier and data extractor 230, or if the OCR quality is below a confidence threshold (or meets some other quality criteria) may be provided to a human in the loop 170 for manual review.

When the documents are consumed by the classifier and data extractor 230, the first step of this module is to separate out the individual sheets of the documentation into "forms" for downstream analysis. Next, using keyword pairs, the type of document may be determined. Even in the diverse world of the film industry, there are a limited number of forms that are used for a given function. In some cases, 24 individual forms for timekeeping are used by different production companies and union entities. By employing keyword pairs, the exact form being analyzed can be identified. In contrast, in some embodiments, machine learning (ML) algorithms may be employed to determine form type. In such embodiments, the system may be presented with records of human reviewed timesheet documents, each identifying the particular form type. The model, over time, learns to classify the document type based upon the historical training data. In some other situations, a hybrid approach of leveraging ML models and keyword pairs may be employed to properly classify the documents.

Next, the classifier and data extractor 230 uses a combination of coordinate range restrictions and keyword matching to extract data from the form itself. Generally this may include determining the range of a table column, and extracting the data found within the column. These entries are compared against the types of data expected for the table column, and is properly coded in a standardized manner.

On occasion, there may be issues not only with the OCR quality being below a confidence threshold, but also with the form not including expected data fields within given coordinate ranges. When such a condition is met, as will be disclosed in greater detail below, the system may forward the form to a human in the loop for manual review 170. When machine learning algorithms are employed, feedback from the human in the loop may be employed to update/train the ML model for greater accuracy in the future.

Once the data has been extracted from the forms it is then converted into a standardized format. This set of standardized formatted timecards are then output stitched together into payloads, using logic, by the same worker. The payload has metadata appended to it and is provided to ingestion, sorting and mapping system 235. This system consumes content in JSON format and applies lookup tables to the data to transform (map) it into data capable of generating a new, standardized timecard. These timecards are then sorted, using business rules, into batches for consumption by the hour to gross (HTG) system 240. The HTG system 240 determines the actual gross compensation owed to the worker. An example of the business logic employed when sorting and mapping data for the generation of timecards is to separate union versus non-union timecards. Other rules may be client driven, such as sorting by department, or by a given classification (e.g., above the line (cast) or below the line (crew)).

The HTG system 240 employs tables of constraints gathered from the contracts data 251, statutory data 252, union constraint data 253 and any client specific data 254. The constraint tables are compared against the timecard data, and constraints with the highest degree of specificity are applied to the timecards to determine the gross compensation owed to the user. The constraint tables are dynamic in nature, and are modified as contracts, union rules, or laws are updated. Additionally, the constraint tables may be geographically dependent as well as dependent upon the specific project. Identification of which contract applies to a given employee may be determined by a matching process of the project, union involved, and payment rate.

The resulting gross payment calculation is then provided to the payroll system 250 for calculating net payments, fringe benefits, taxes, etc. These kinds of calculations are known, as are payroll software packages that provide such services. As such, details of the payroll system 250 will be omitted for the sake of brevity and clarity. The finalized payment documents and calculations are then provided to the studio 160, via the network 130, to actually facilitate the payments to the clients 110a-x.

The following figures and descriptions shall provide greater details of each of the individual components of the intelligent payment system 140. Again, the descriptions contained herein are intended to be exemplary in nature, and the following invention shall not be restricted to any single embodiment.

Figure 3:
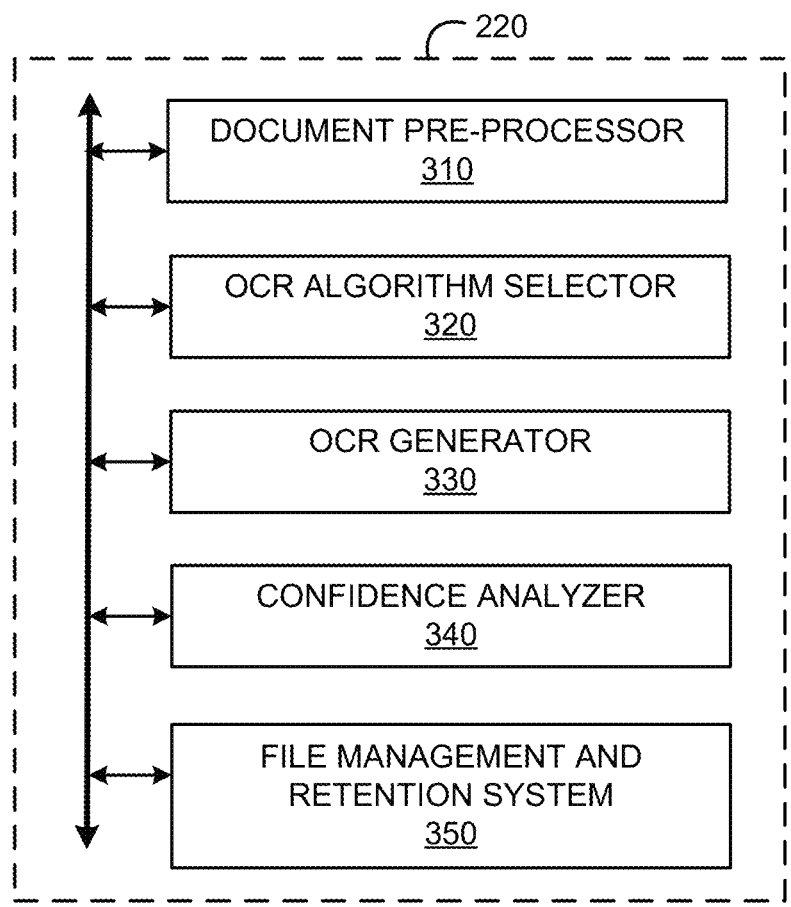
FIG. 3 is an example block diagram showing the OCR engine, in accordance with some embodiment.

FIG. 3 provides a greater detailed illustration of the OCR engine 220. The OCR engine may include a document pre-processing system 310 which performs activities such as removal of scanning artifacts, rotation of the image, cropping of non-document imagery, saturation and contrast enhancements, and any other pre-OCR activities. Subsequently, the OCR algorithm selector 320 may analyze the pre-processed image and select for the OCR transform(s) which are best suited for converting the image to a computer readable document. A number of OCR transforms, and when they are best employed, are known. Likewise, it is understood in the art effective ways of selecting the 'best' OCR algorithm. After the transform is selected, the OCR can actually occur with the OCR generator 330. A confidence level for the OCR can also be generated. This confidence score may be provided to a confidence analyzer 340. The confidence analyzer 340 may refer the document to a human in the loop if the confidence score is beneath a given percentage. Lastly, the OCR engine, in the instant embodiment, may include file management and retention tooling 350 for storing copies of the OCR documents.

Figure 4:
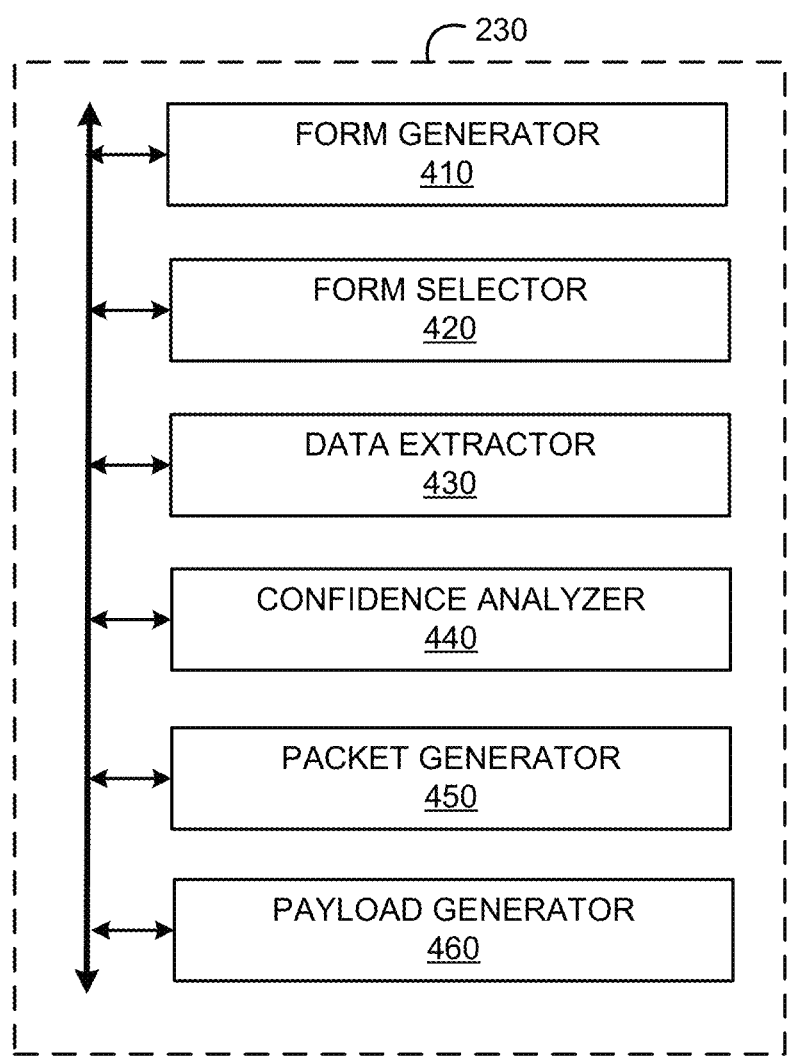
FIG. 4 is an example block diagram showing the classifier and data extractor, in accordance with some embodiment.
Figure 5:
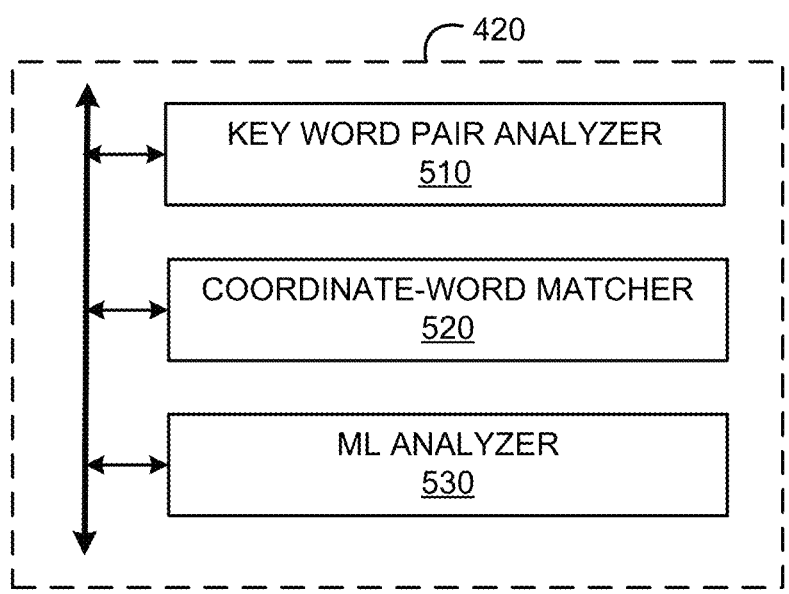
FIG. 5 is an example block diagram showing form selector of the classifier and data extractor, in accordance with some embodiment.

As noted before, the OCR documents are then provided to the classifier and data extractor 230 system for data collection. This system 230, as seen at FIG. 4, includes a form generator 410, which splits the OCR documents into individual 'sheets'. Each 'sheet' comprising its own 'form'. Next, the type of form is identified by the form selector 420. Turning briefly to FIG. 5, form type classification can be based upon keyword pairings by a keyword analyzer 510, ML models by a ML analyzer 530, or some combination of the two. In some embodiments, each of the possible 24 forms can be disambiguated by the presence of two keywords each. Thus, be doing searches for the inclusion of both keywords, the form type can be identified. In yet other embodiments, specific keywords may be searched for in the document at particular coordinate points by a coordinate-word matcher 520. This coordinate-word matching can be utilized for the actual classification of the form into a particular type or may be employed as a check of the earlier classification. The coordinate-word matcher 520 may also work in reverse in order to perform document calibration. For example, a word may be looked for in a fairly wide range of coordinates around where the word is "expected" based upon the form layout database. However, commonly the scan of the document is not perfect, and the form may be shifted around, resized differently, or otherwise skewed. The coordinate-word matcher 520 is able to determine the degree of offset that the word is located at, and adjust the image by moving/panning it to the correct location. Likewise the sizing of the word analyzed for may be compared to an expected word font size. The image may then be expanded or shrunk to match the expected font size. These two actions calibrate the image to match an expected image layout, thereby rendering the later data extraction process more effective.

Figure 6:
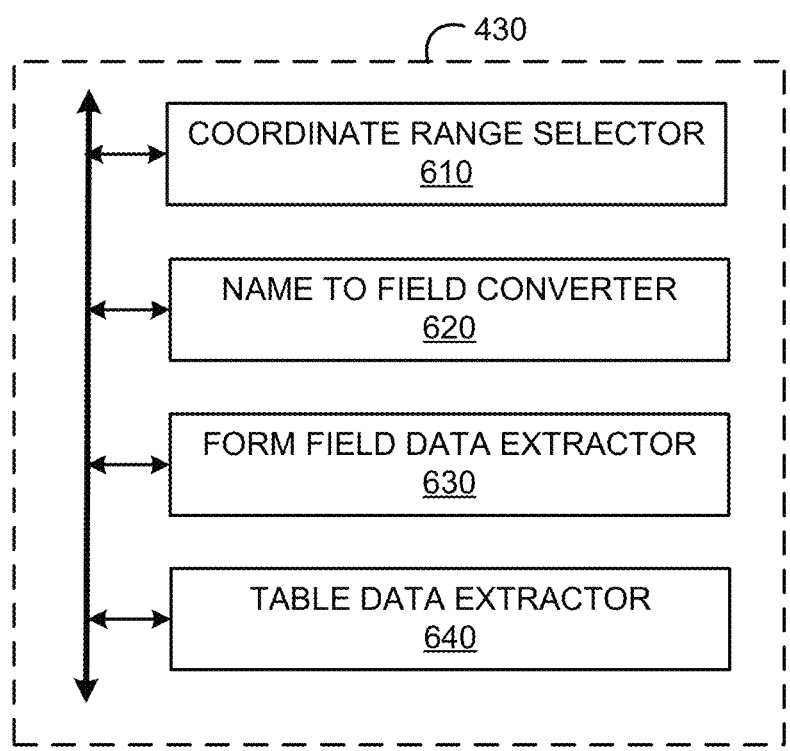
FIG. 6 is an example block diagram showing the data extractor, in accordance with some embodiment.

After the form type is known, the form layout database 256 can be queried to identify where in the given form particular data can be found. This location data enables the data extractor 430 to perform keyword extraction in given coordinate ranges. FIG. 6 provides a more detailed explanation of the logical components of one embodiment of the data extractor. The data extractor utilizes coordinate ranges to search for expected text. The coordinate range selector 610 enables the system to be configured to search for a given term in the selected range. The name to field converter 620 actually performs the keyword search and when found, converts the keyword into a standardized field code. A form field data extractor 630 may populate the coded information types with the specific information found in the OCR document. For example, if it is known that for a given form the coordinates for the name of the individual are between $(x_1,y_1:x_2,y_2)$, the system may perform an extraction of the OCR data in this range, and code it as "NAME". In a similar manner, each element of the OCR document may be extracted and coded. Collecting data from tables and the like is performed in a similar fashion. The table data extractor 640 utilize coordinate boundaries which are known to include a table column. The column name is extracted in much the manner as discussed above. Next, entries in the column are collected. Column entries are often expressed differently between individuals, regions and projects. The system therefore requires the usage of concrete logic to compare the table entries to expected column entries.

Returning to FIG. 4, as with the OCR itself, it is possible to calculate the confidence threshold of data extraction. The confidence analyzer 440 may compare labels of data against where they are "supposed to be" based upon the form layout data. If, for whatever reason, there is a disconnect between coordinates and expected labels, or if there are empty fields where the coordinate data says a mandatory field should exist, the confidence of the data extraction will be reduced. If the confidence falls below a given threshold, this is another avenue to draw in a human for manual processing, or an audit of the automated system.

Figure 7:
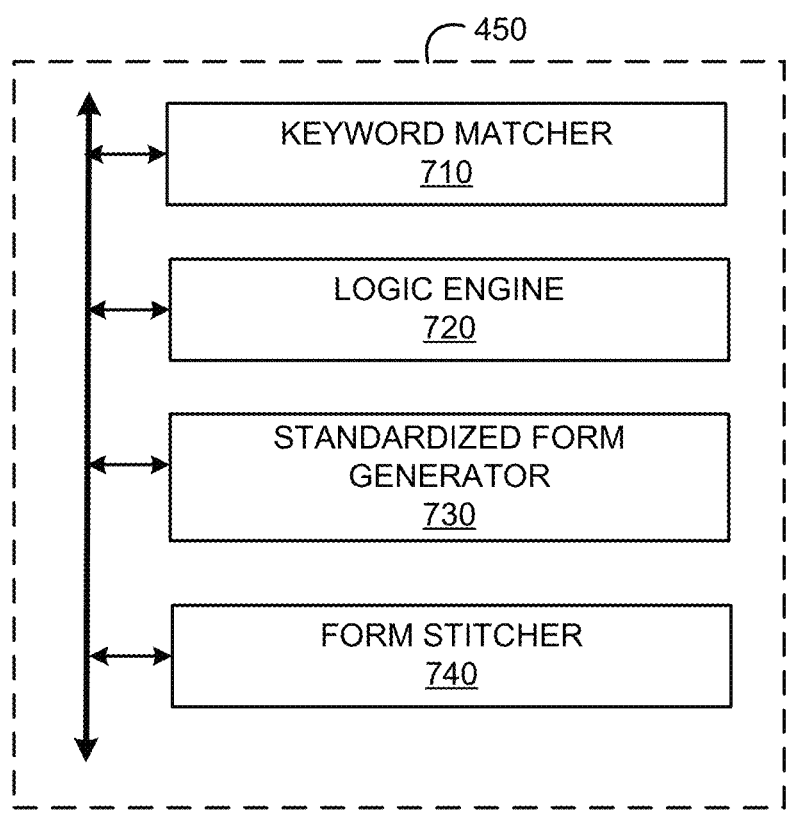
FIG. 7 is an example block diagram showing the packet generator for the classifier and data extractor, in accordance with some embodiment.

Once the data has all be extracted, the packet generator 450 generates a standardized set of forms, and utilizes logic to identify all forms that belong to a particular individual. FIG. 7 provides a more detailed explanation of the logical components of the packet generator 450 in accordance with some embodiments. In some embodiments, the packet generator 450 comprises a standardized form generator 730 which leverages all the coded and extracted data to generates a standardized form for each document that was originally ingested. This means that, regardless of the format of the original incoming form, the output form will be identically formatted with the other output forms.

Subsequently, the packet generator 450 includes a keyword matcher 710 which initially attempts to match one form to another by exact matches of the user's last 4 digits of their social security number and/or name (first and last) and by project. However, most often the name of the individual is not provided consistently by either the user, or by the various forms. For example, on one form it may have a field for "name" first and last. Another form may have a separate field for the first name and the last name. Some forms may have a field for a middle name. In other instances, the user may write out her name as "Katlynn" on one form and "Kate" on another. As can be seen, many different permutations of the same information, both in format and actual content, may exist. This makes linking together documents by a common user difficult to achieve just using the keyword matcher 710. As such, a logic engine 720 may be leveraged to link together documents by a common individual. This may be by name matching, employee ID and/or social security number matching, or by other metrics, such as handwriting matching or the like. The logic engine 720, in some embodiments, may focus upon making a name match despite shortened versions of the first name and differences on where the information is found on the given forms.

Once all forms relating to the same individual are identified, these forms are stitched together into a single packet by the form stitcher 740. In some embodiments the packet may be in JSON format.

Returning to FIG. 4, after packet generation, the payload generator 460 adds information such as page number, file ID, and associated pages as metadata to the packets. The packets are ingested, mapped using lookup tables to transform the raw data into timecard entries, and then sorted into batches. These packets are then transferred to the HTG system 240.

Figure 8:
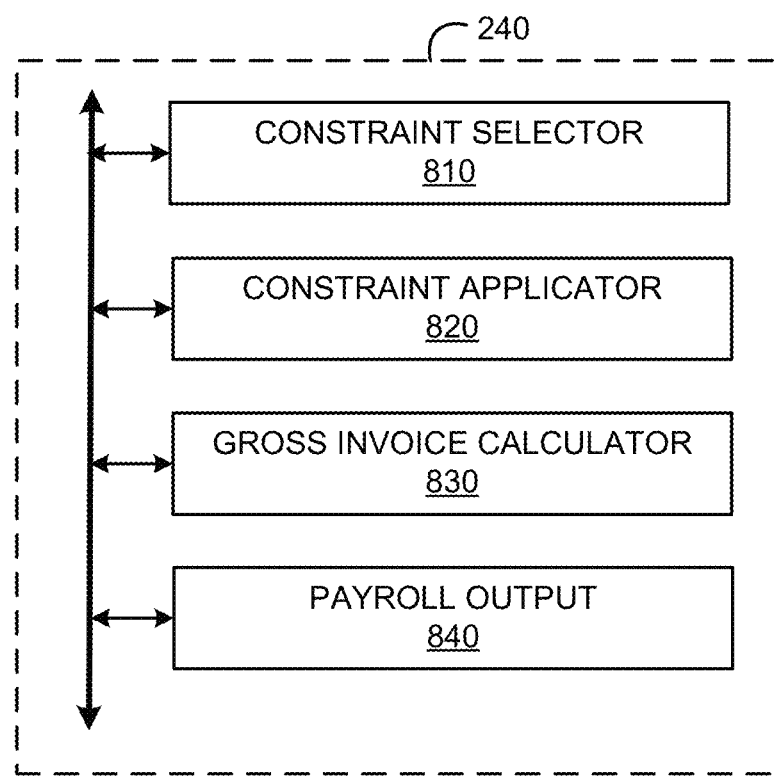
FIG. 8 is an example block diagram showing the hours to gross (HTG) engine, in accordance with some embodiment.

FIG. 8 provides greater detail into the logical components of the HTG system 240, in accordance with some embodiments. In the film industry (and other industries that are highly unionized and/or freelance driven) there are a large number of constraints/rules which dictate how an employee is treated and compensated. These rules may be statutory (minimum wages and overtime requirements, for example), unionized rules (pay varies based upon number of hours worked in a contiguous period, for example), or contractually mandated (pay for a given project, at a given location for example). Further, these rules are often mercurial; shifting often based upon project deadlines, overruns and other factors. As such, the rules must be dynamically accounted for.

Payment rules are also hierarchical in nature—one rule may specify a wage (union wage) for example, yet another rule may specify a different wage (contract/project wage). Only the highest rule in the hierarchy is then applied. Logical rules are leveraged in order to indicate which payment rule to apply.

In some embodiments, the rules/constraints are formatted in a rules table, with each column of the table providing attributes of the given rule. The sequence of rule/constraint execution is selected for by the constraint selector 810.

After the constraints have been selected for, the constraint application 820 actually applies the rules to the standardized formatted timesheet. This provides the hourly wages that are due to the user based upon the user's activity. These hourly wages are summed over the applicable periods (calculated across each of the packets of standardized timesheets for the given user) to generate a gross compensation amount by the gross invoice calculator 830. The final amount, any metadata involved, and copies of the timecard packets are then all provided to the payroll system for final processing by the payroll outputter 840.

Figure 9:
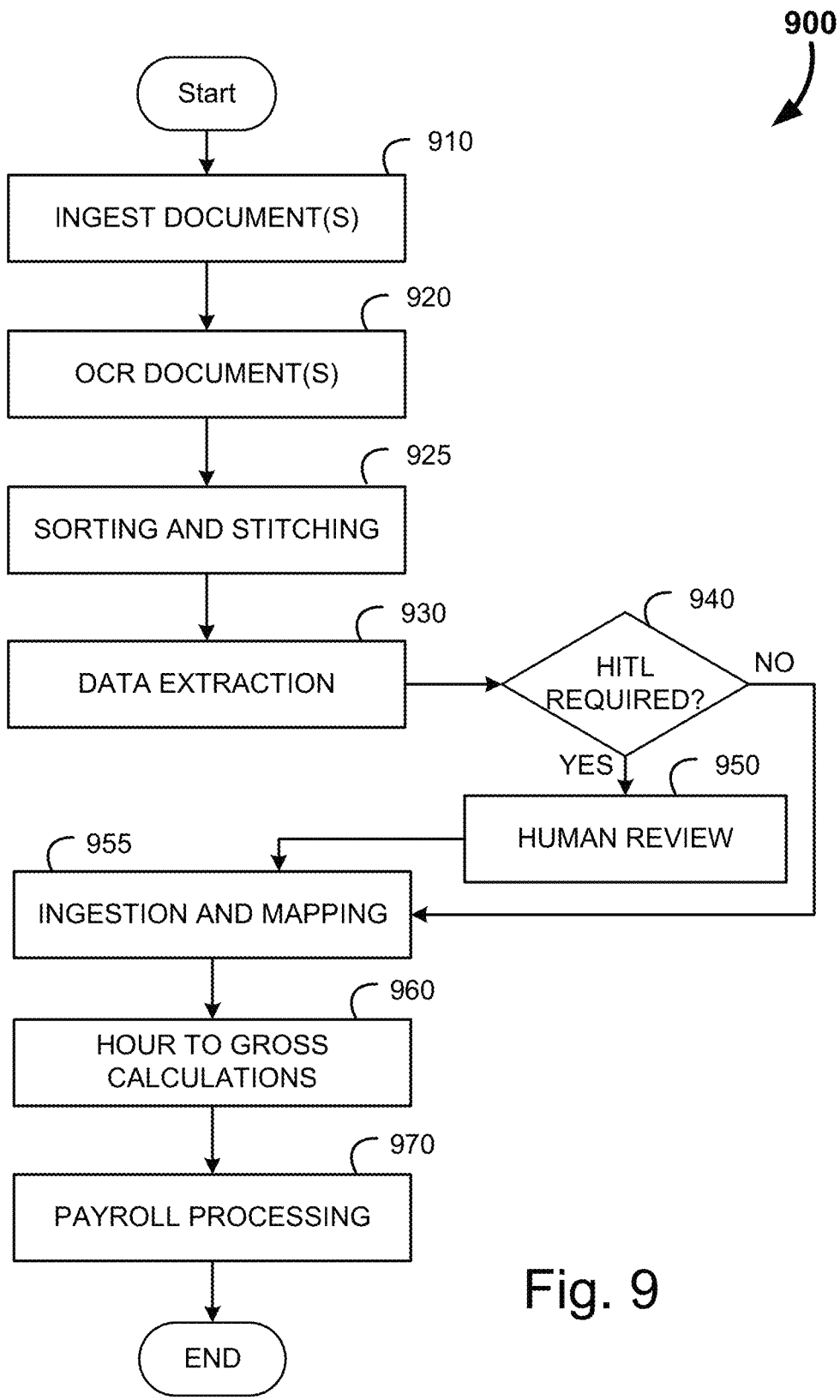
FIG. 9 is an illustration of an example process for payroll management within a freelance driven industry, in accordance with some embodiments.

Now that the systems for intelligent payroll management have been disclosed in considerable detail, methods of the system's operation shall be described in relation to FIG. 9, shown generally at 900. Initially, documents are ingested by the system (at 910). Document ingestion occurs when the user supplies the documents to the system as a digitized image. In some embodiments, the system has an online portal which allows the user to upload images of their timecards and associated documentation.

Figure 10:
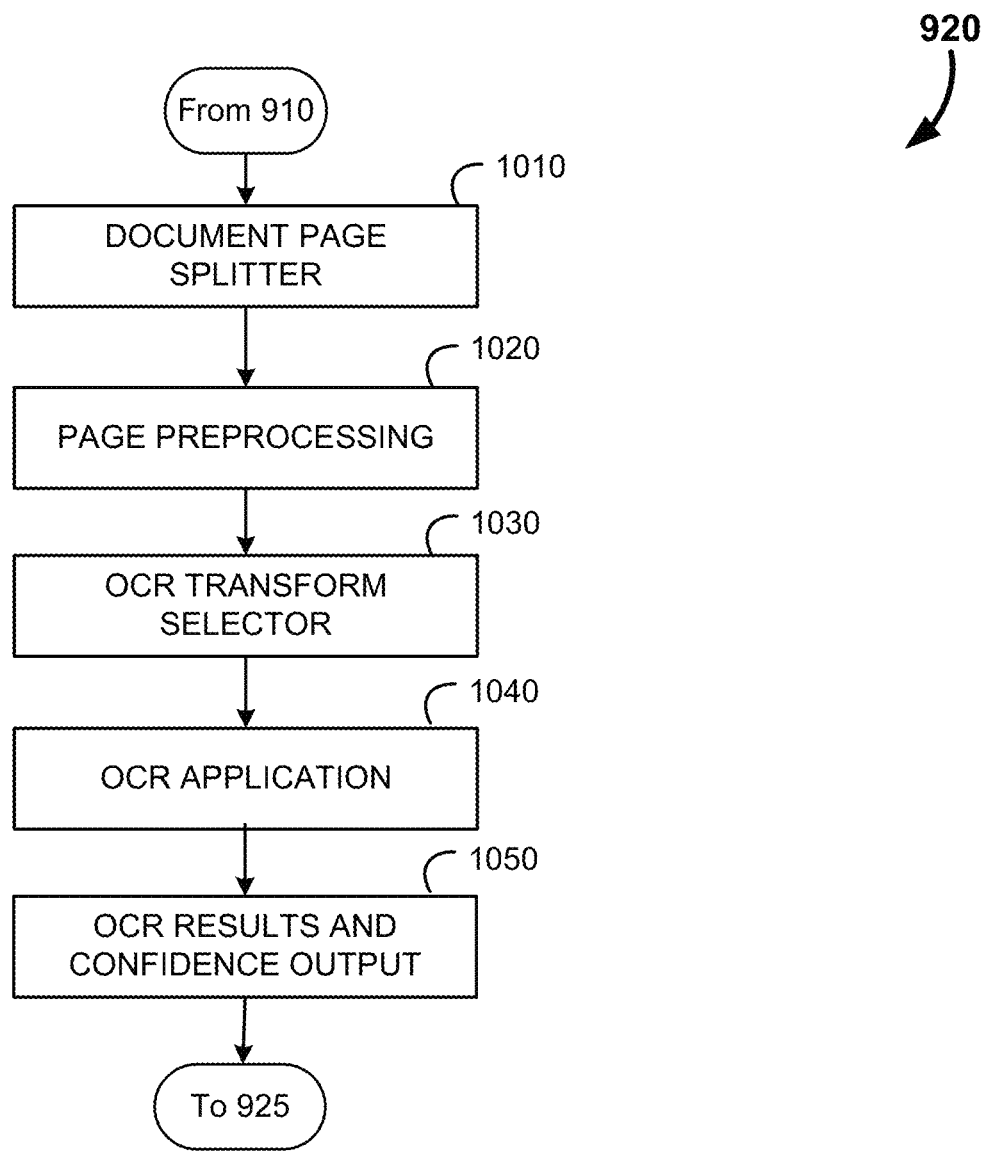
FIG. 10 is an illustration of an example process for optical character recognition (OCR) completion, in accordance with some embodiments.

After ingesting, the documents are subjected to optical character recognition (at 920). FIG. 10 provides a more detailed example process for this OCR step. Initially, the documents are split into individual pages for processing (at 1010). Each page is preprocessed in order to yield the best OCR outcome (at 1020). OCR preprocessing may include zooming the page in or out, cropping the image, increasing or decreasing contrast and/or saturation, rotating the image and the like. An OCR transform is selected (at 1030). OCR transform selection, and methods of pre-processing the image to yield superior results are known, and the most effective techniques available are applied for the present invention.

After the pre-processing and transform selection, the actual OCR can occur (at 1040). As many of the fields of the form are handwritten, even with the best OCR transforms selected, it is often difficult to properly determine what is written (as opposed to a typed field). As such, the OCR system provides a confidence interval for how accurate the OCR is believed to be. This confidence output may be for the document as a whole, or may be for a short segment of contiguous writing. The OCR results and the confidence interval(s) are then output (at 1050) for downstream analysis.

Figure 11:
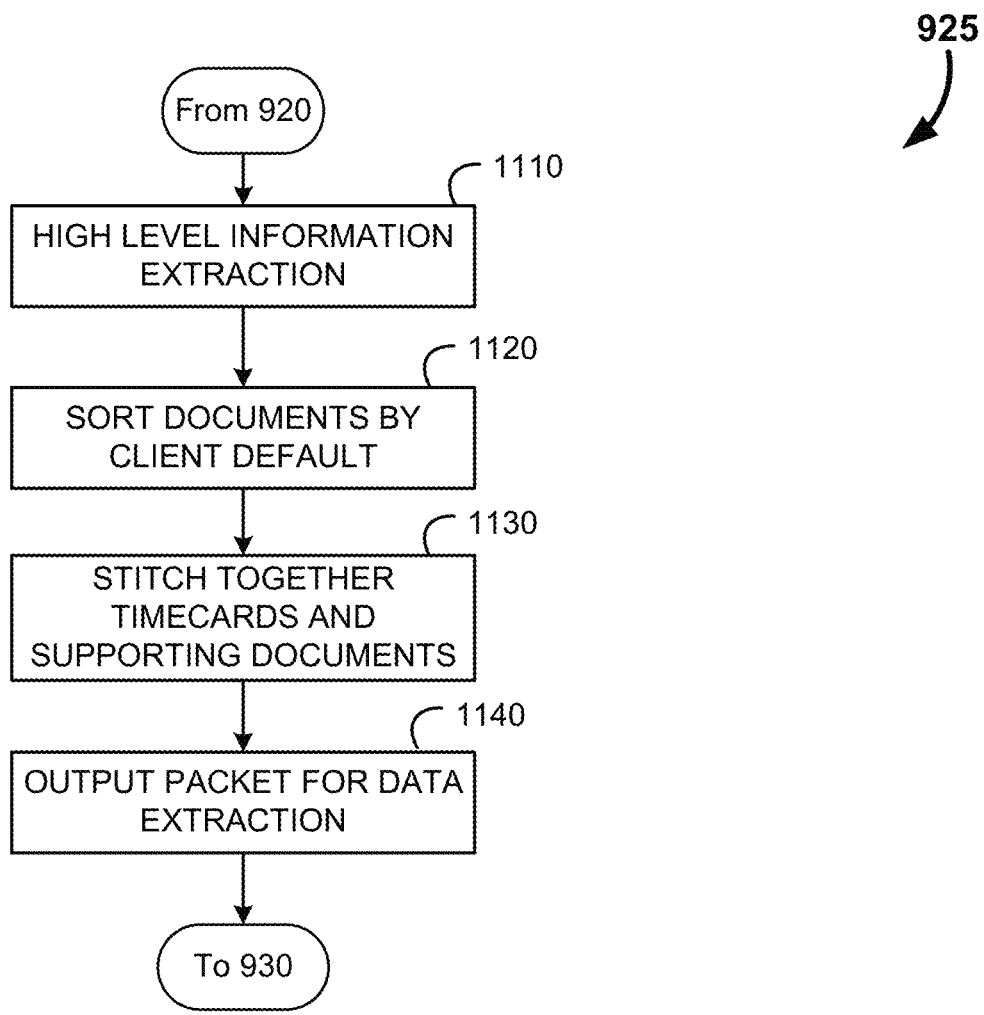
FIG. 11 is an illustration of an example process of document sorting and stitching, in accordance with some embodiments.

After OCR is completed, the images sorted and stitched together, as seen in FIG. 11. Initially there is a very high level of information extracted from the OCR documents (at 1110). This extraction may include basic keyword extraction, or as with later extractions, may include identifying script at a particular location of the document image. At this high level information extraction step, project name, week end date and client name may be extracted, at a minimum. This high level data is utilized to sort the documents by a client default arrangement (at 1120). This includes keeping all timecards in the order of their submission. Supporting documents are stitched together with the appropriate timecard that has the reimbursement request associated with the supporting document as well. Once properly sorted, the timecards and supporting documentation is stitched together (at 1130) and the resulting packet is output for data extraction (at 1140).

Figure 12:
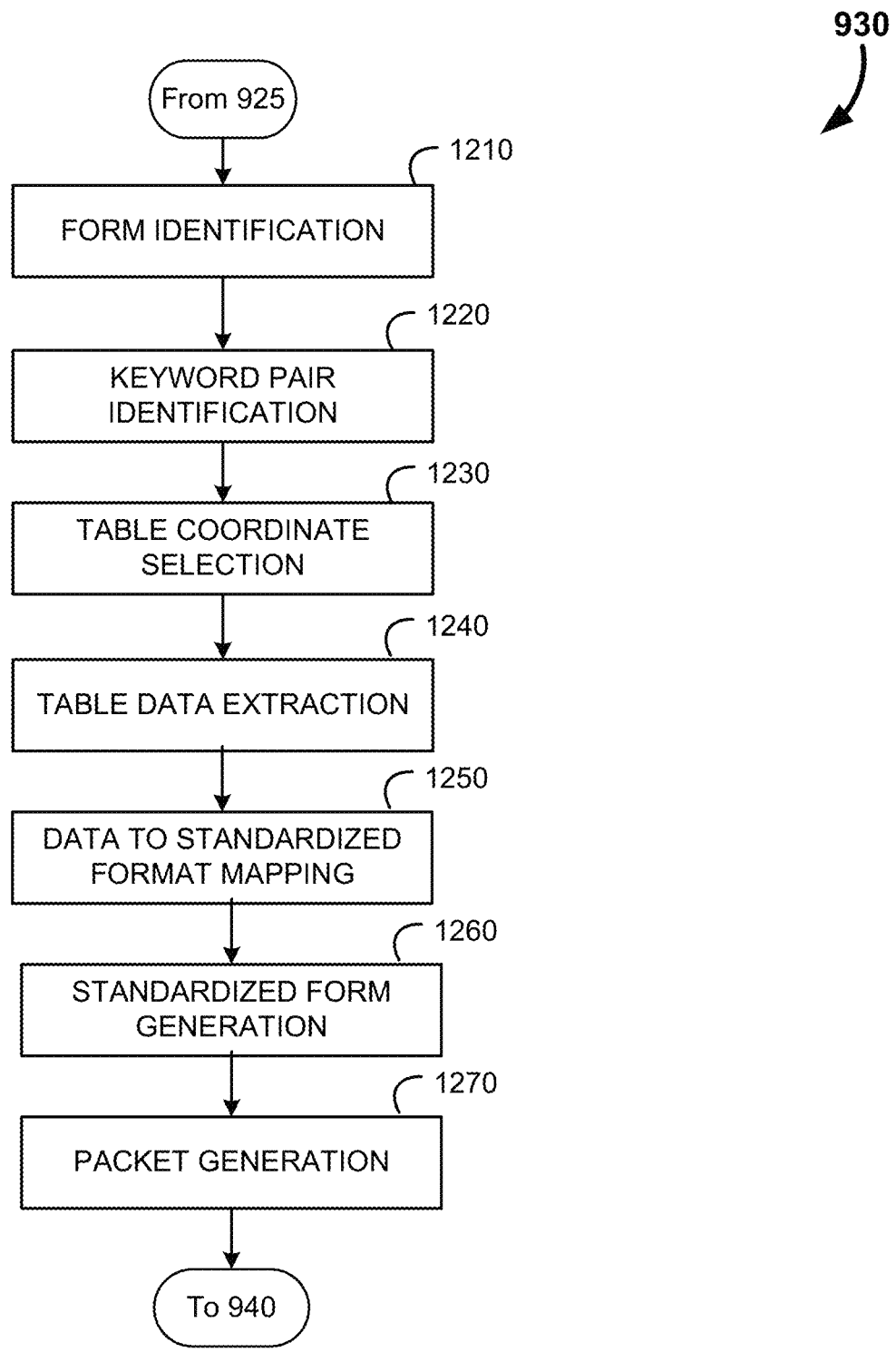
FIG. 12 is an illustration of an example process of data extraction, in accordance with some embodiments.

FIG. 12 provides greater detail of this data extraction step. Initially, the individual forms are identified from among a set of known form types (at 1210). Form type identification may be performed by machine learning identification, and/or via keyword matching. For a limited number of form types, such as the 24 commonly used in the film industry, simple disambiguation by keyword matching may suffice. However, as the number of possible form types increases, machine learning models may be particularly well suited to determine which form type is present.

After the form type is identified, then, optionally, the form may be calibrated for easier data extraction (not illustrated). Calibration may include adjusting the sizing of the form image, rotating the form image, and/or panning the image to ensue the text within the form aligns with the expected locations based upon the form layout data stored in the datastore. Calibration may occur by looking for a particular word/phrase is an area where it roughly should exist. When found the word size and orientation can be used to modify the image zoom and rotation. The coordinate location of the word may be compared against where the exact location of the word should be in order to calibrate the image pan.

Regardless of if the image is calibrated or not, after the form has been identified, keyword pairs are used to identify information in the document (at 1220). For example, the form may have a field for the user's end week date. The system recognizes, based upon the form layout data already known, that the end week data is located at a particular coordinate location. The system extracts the OCR text from this location and codifies it as the data corresponding to "WEEK END DATE". In a similar manner, table coordinates are selected (at 1230) and the data within these tables is extracted (at 1240).

After all relevant data has been extracted, the system may reconstitute the form in a standardized format (at 1260).

Figure 13:
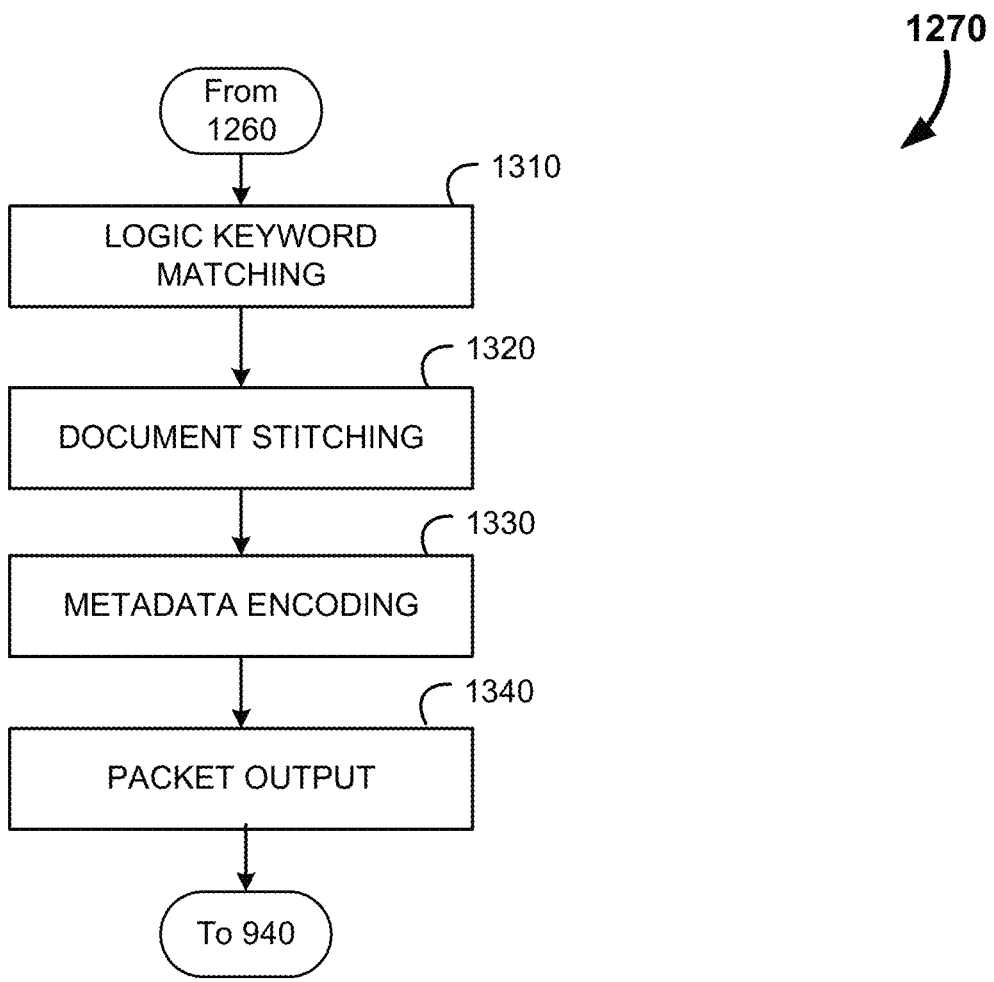
FIG. 13 is an illustration of an example process of packet generation, in accordance with some embodiments.

These standardized forms may be compiled into a packet (at 1270). Packet generation is described in greater detail in relation to FIG. 13. Initially, logic keyword matching is leveraged to match the last four digits of the user's social security number and/or first and last name of the users (at 1310) so that all forms that belong to the given user are compiled together. In some embodiments, additional data is used to determine if the user is the same individual. This may include matching other data such as employee ID, birthday and other identifiers. It is even possible to match together user forms based upon metadata of the originally submitted forms, handwriting matching, and other techniques. Regardless of method employed, once all form belonging to the instant user are identified they are stitched together into a contiguous set of documents (at 1320). Metadata for these documents, including page number, file ID and associated pages are all encoded (at 1330). Lastly, the package is output to the HTG system (at 1340) for downstream analysis.

Returning to FIG. 9, after data extraction is complete, the system may make a determination if a human in the loop is required (at 940). A human may be required if the OCR confidence is below a certain threshold, or if there is an inconsistency in the data extraction step. An example of this kind of inconsistency includes, for example, when the form type cannot be disambiguated, or if there is nothing present in a coordinate location where mandatory data should be present. If a human is required, the process sends the documents to a human reviewer (at 950) for document classification and/or data extraction. If the automated process does not encounter any issues that would warrant human intervention, the process proceeds to ingestion and mapping of data prior to calculating hours to gross compensation (at 955).

Figure 14:
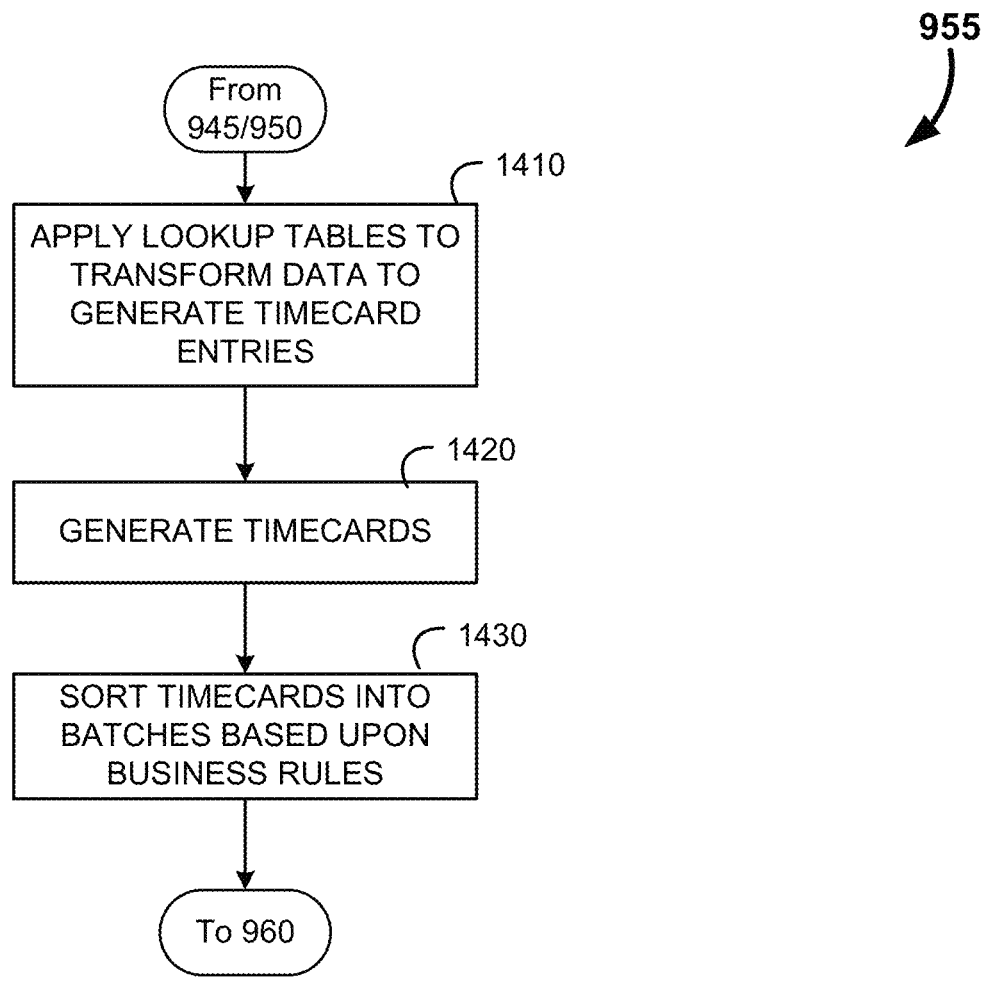
FIG. 14 is an illustration of an example process of data mapping and timecard generation and sorting, in accordance with some embodiments.

FIG. 14 provides a more detailed process flow for the step of data ingestion, mapping and sorting of the resulting timecards. Initially, after data extraction, the raw data in JSON format is received and transformed using lookup tables (at 1410). This data mapping step leverages business rules to populate the lookup tables. The tables convert the raw data into data that is able to create timecards in a standardized format (at 1420). Another set of rules allows the generated timecards to be sorted into batches (at 1430). Examples of sorting rules may include separation of union versus non-union timecards, for example. Sorting may also be done in a client specific manner, based upon needs of the given downstream studio. In some embodiments, the sorting maintains the sequence in which the client provided the timecards, however. These sorted batches of timecards and invoices are then consumed by the hour to gross (HTG) system for calculating the amounts for payroll.

Figure 15:
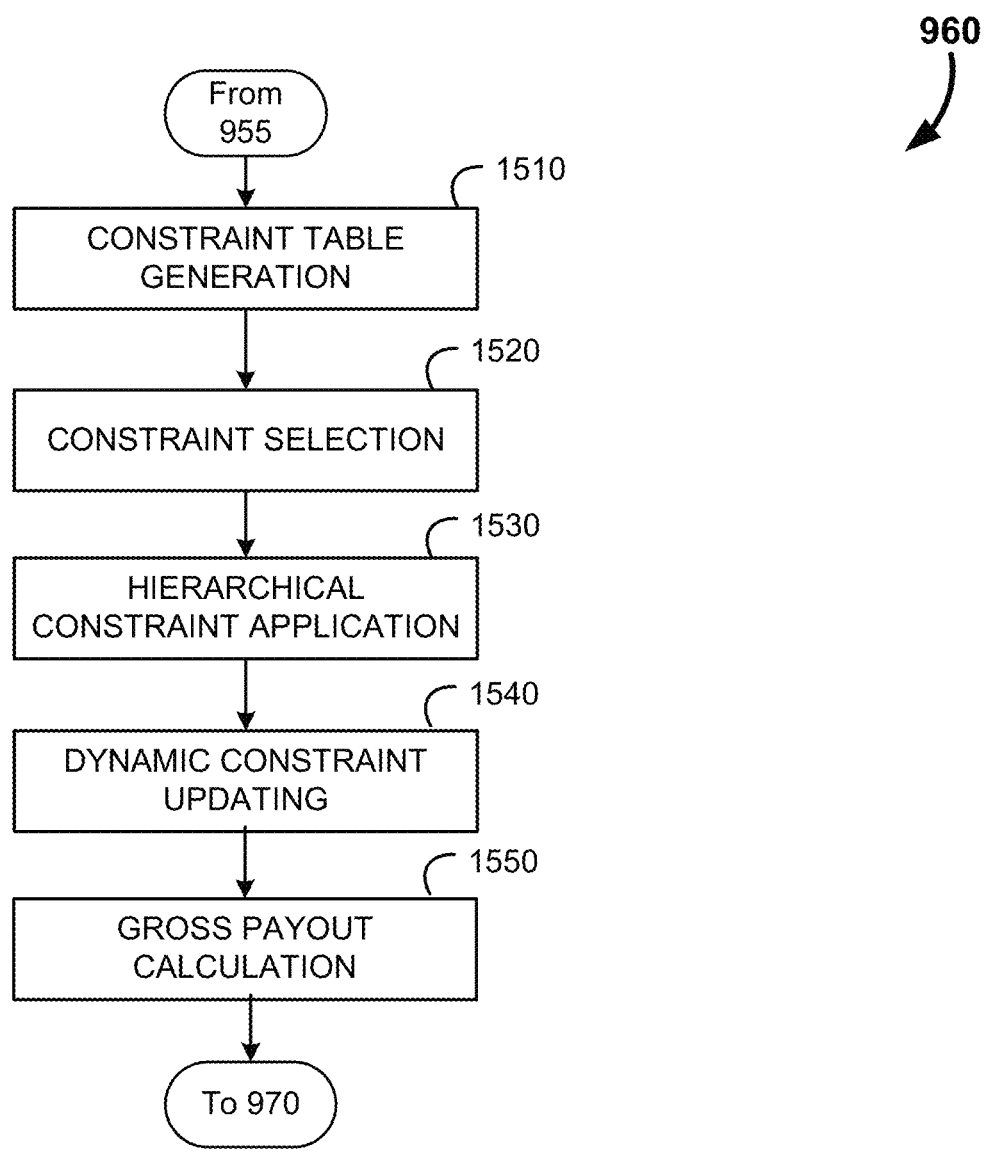
FIG. 15 is an illustration of an example process for hours to gross payments calculations, in accordance with some embodiments.

FIG. 15 provides a more detailed description to the process for hours to gross calculations. Initially a constraint table is generated (at 1510). The constraint table includes the rules/constraints required by project contract, union rule, or statutory requirement. Each column in the table includes a constraint/rule with the rows providing attributes for the given constraint. The system then compares the instant timecard to the table, and based upon the degree of specificity (e.g., the rule that has the largest number of attributes matched) the proper constraint is selected (at 1520). The selected constraints are then hierarchically applied to the timesheet (at 1530).

As the industries that such a system is intended to be applied within is often in a high degree of flux, the system may account for these shifting rules and constraints by dynamically updating the constraint tables (at 1540). This ensures that newly processed timesheets are properly accounted for based upon the date the work was completed. After all the proper constraints have been applied, it is relatively trivial to perform the final gross payout calculation (at 1550). These calculations also include the generation of invoices for the downstream payroll activities.

Returning to FIG. 9, after the gross calculation has occurred, this number is provided to the payroll portion of the system for the calculations of net payments, fringe benefits, taxes, and the like. All of this information is then retained for archival purposes, and also provided to the client to actually make payments to the users. This ends the process.

Moving on, FIGS. 16 to 21 provide example screenshots of the process and interfaces for the intelligent payroll management system. These figures and illustrations are intended to be entirely exemplary in nature. The figures provided herein illustrate one of any number of ways to substantiate the underlying invention. As such, these illustrations, while meaning to be clarifying, do not in any way limit the scope of the present inventions.

Figure 16:
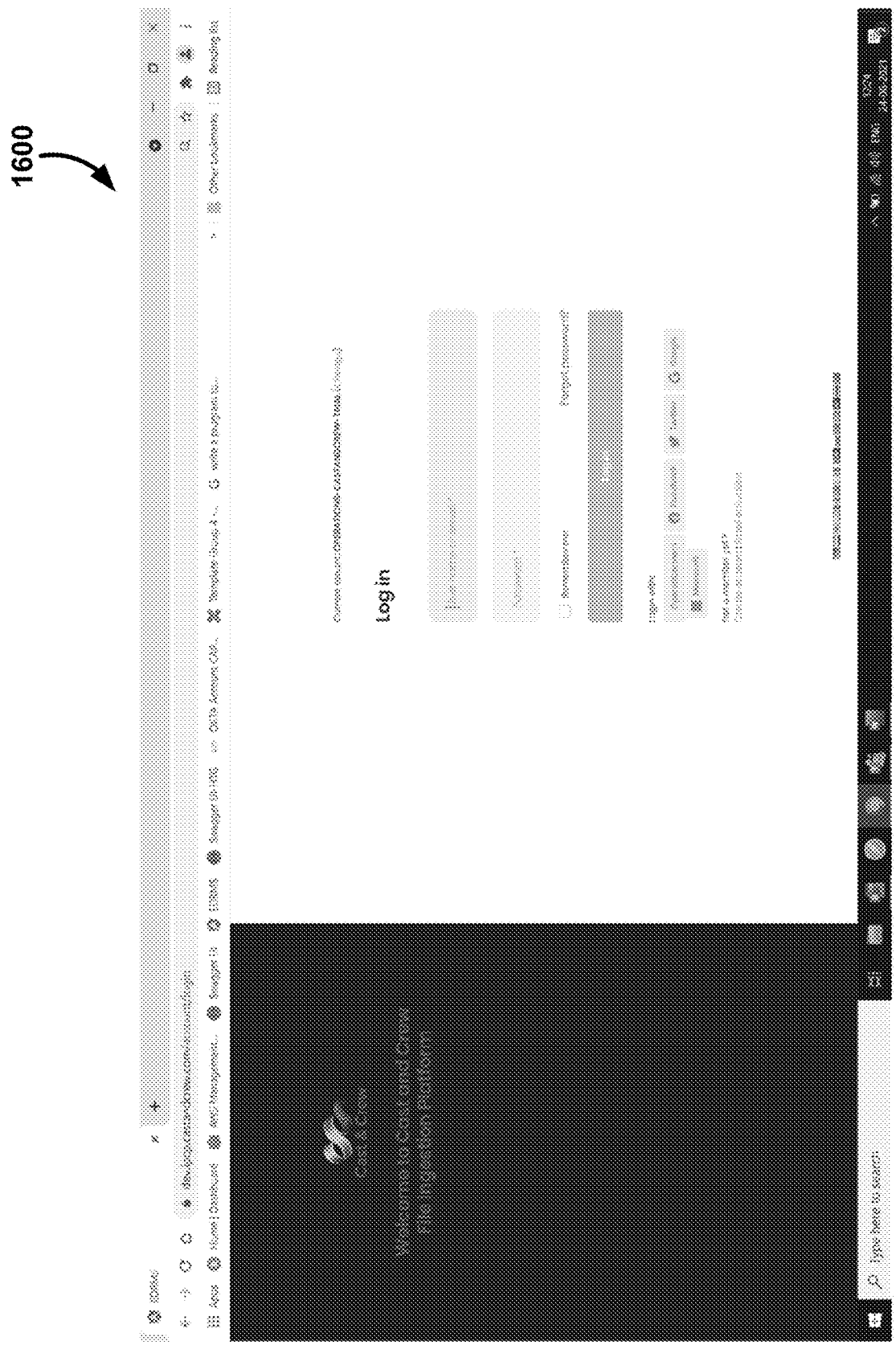
FIGS. 16 to 21B are illustrations of example screenshots of the intelligent payroll management system, in accordance with some embodiments.

FIG. 16 provides an example illustration 1600 of an internal portal which allows for access the system. The system is accessible using a username and password key pair, or may leverage other known authentication techniques, including single sign on (SSO) or the like.

Figure 17:
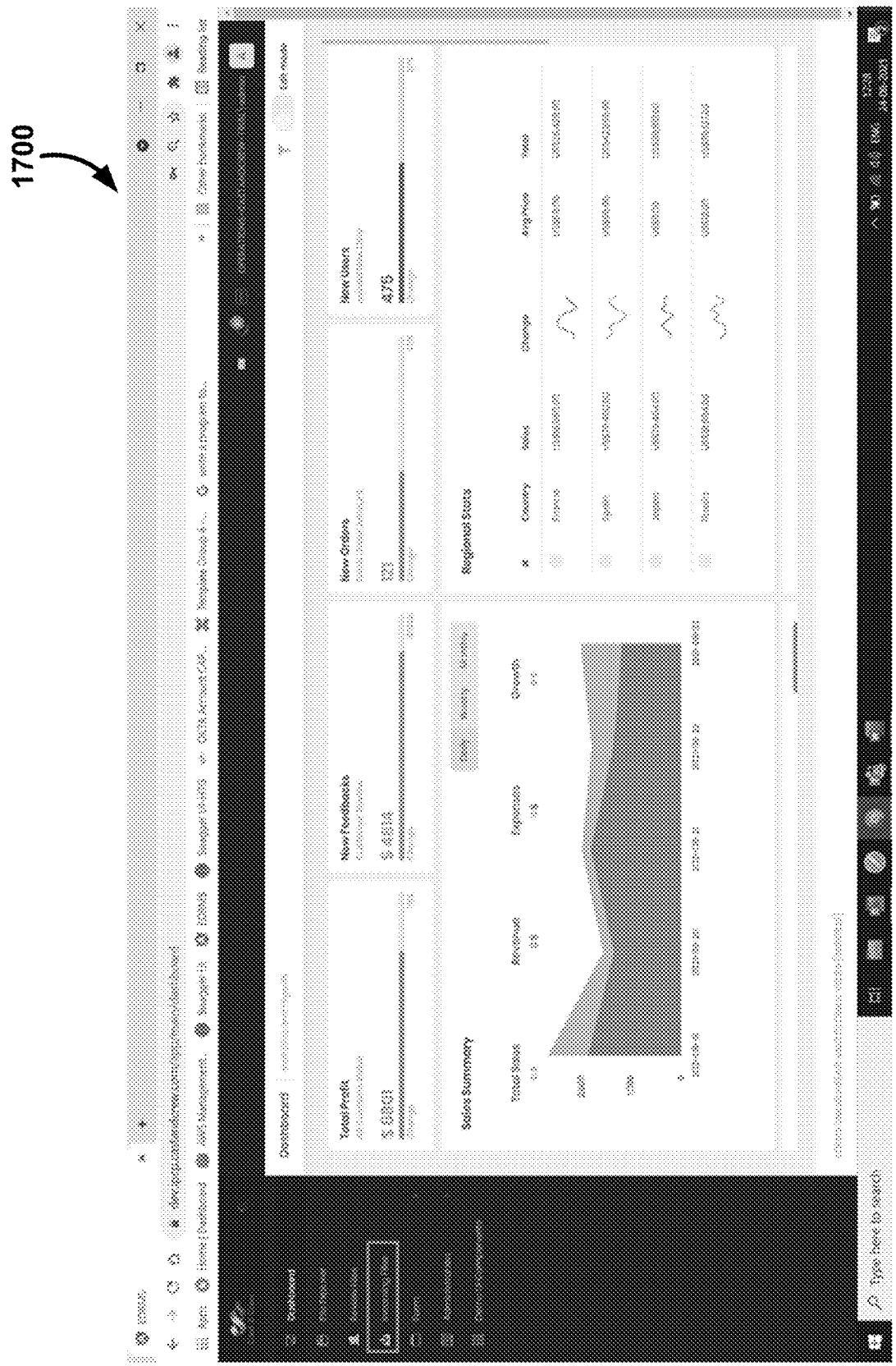

Once logged in, the system user may be presented with a landing page, as seen in the illustration 1700 of FIG. 17. This example landing page includes a number of statistics and metrics that are of interest to the user, including financial metrics by region, new orders, and the like.

Figure 18:
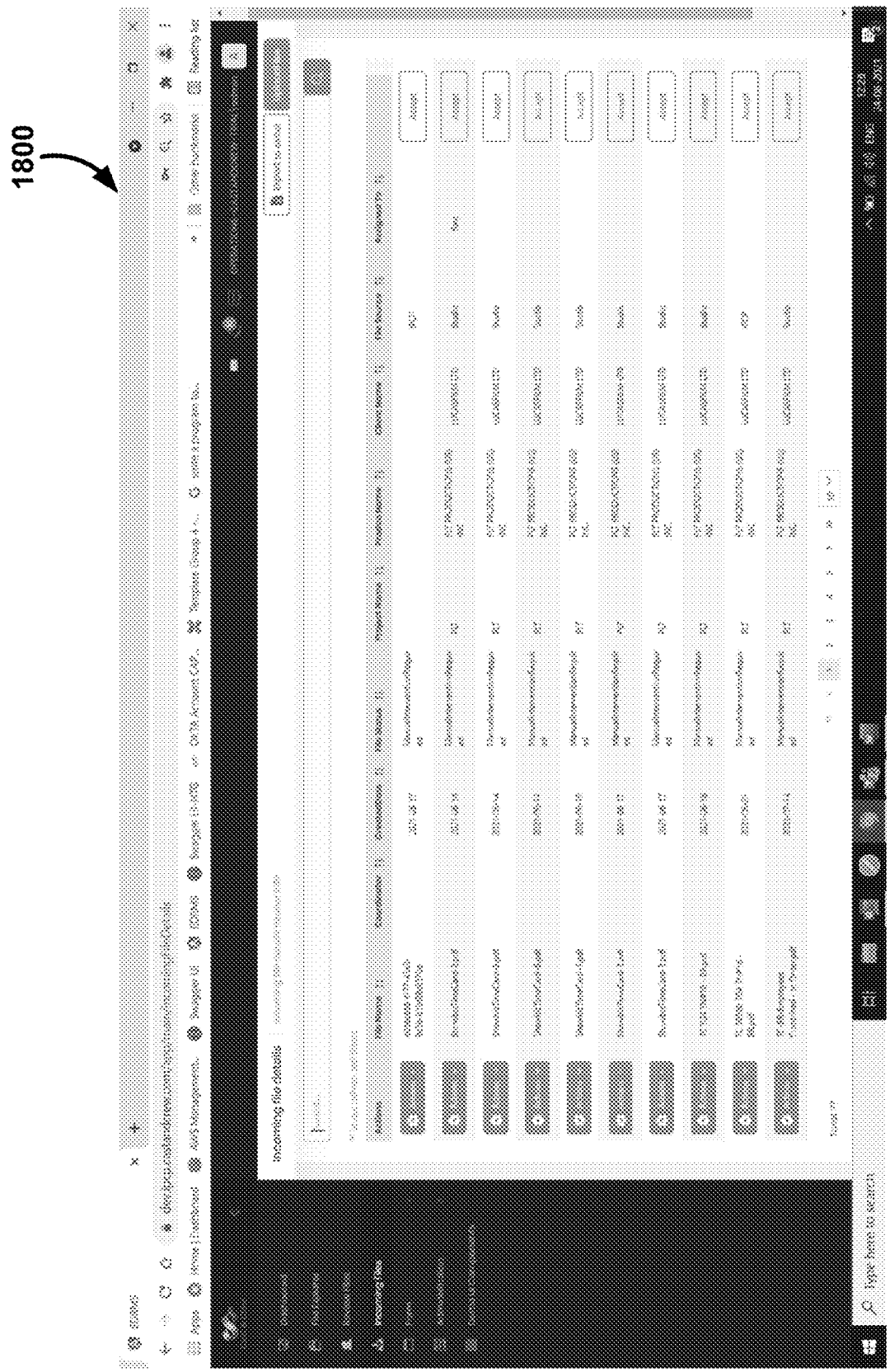

If the user were to select "incoming files" on the left hand navigation bar, the user is redirected to a file detail description page, as seen in illustration 1800 of FIG. 18. Here, each now OCR file is illustrated, and actions may be taken on any given file by selecting it accordingly. Files may be accepted, redirected to another end user, and redirected to a review file section.

Figure 19A:
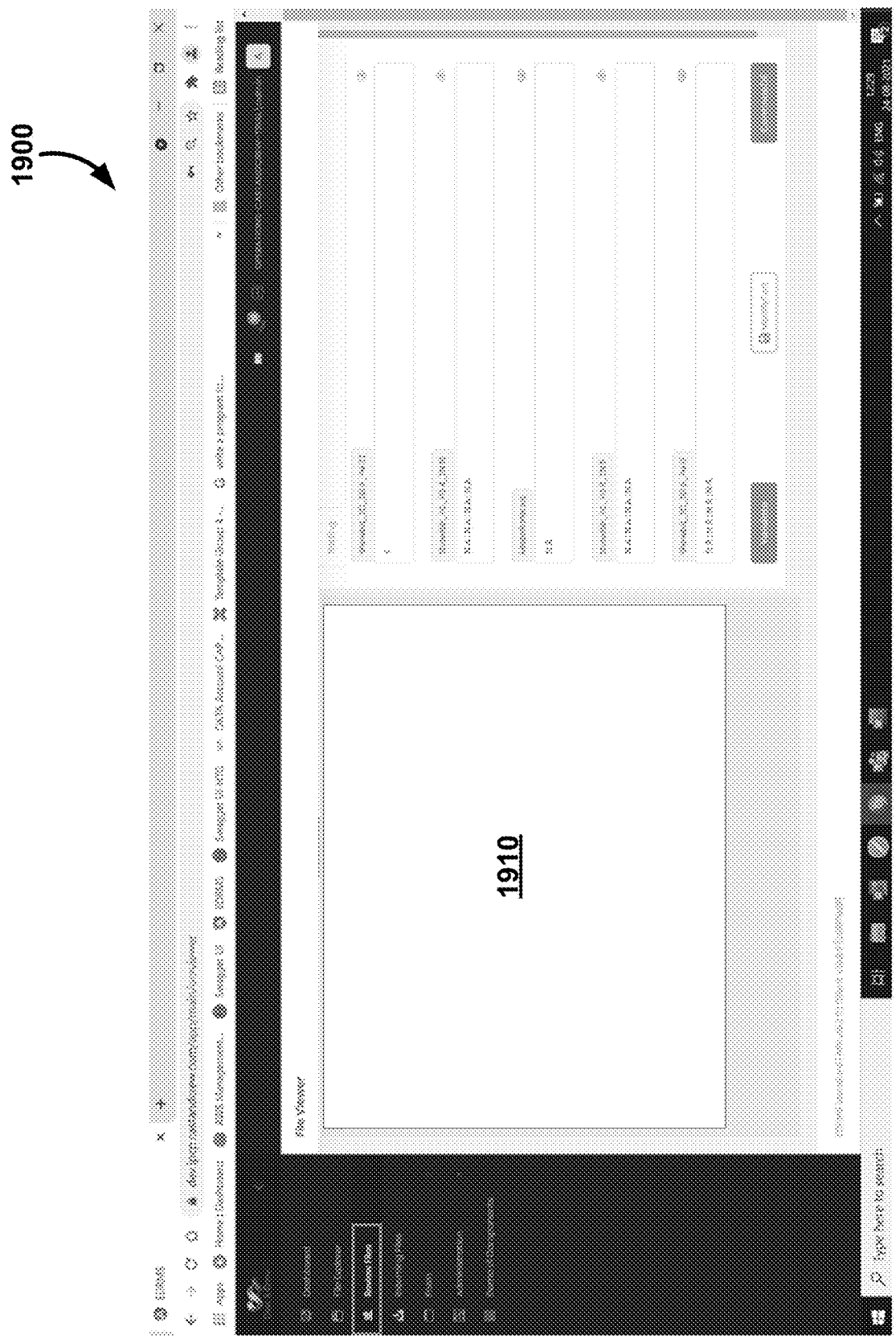
Figure 19B:
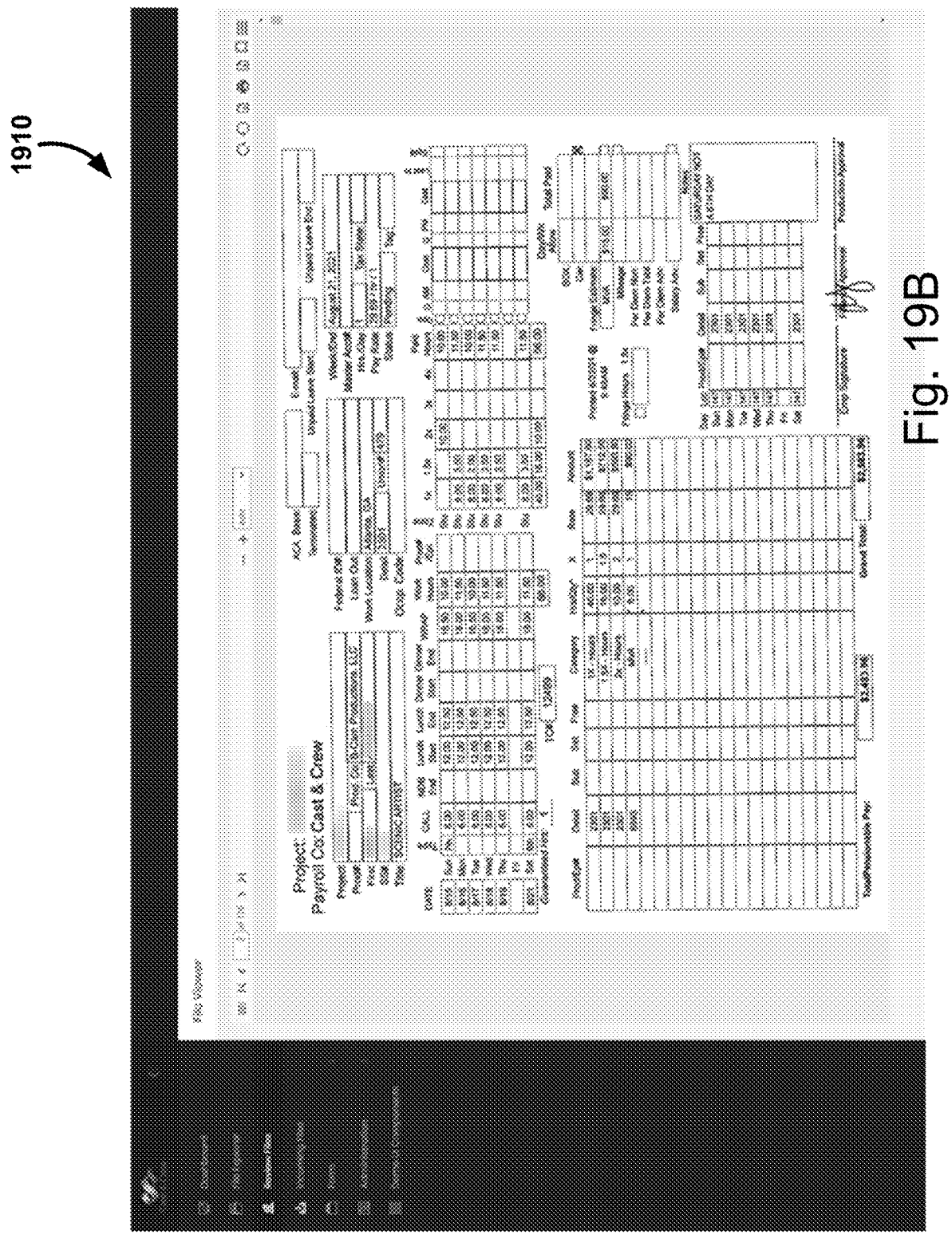

By selecting "review files" on the navigation bar, the OCR image of the file 1910 may be presented to the user, as seen in illustration 1900 of FIG. 19A. The actual image is shown, along with sorting information. The user can choose to select the validation button on the right side of the screen in order to validate and modify the sorting criteria. The user may likewise select to continue in order to extract the data from the document. FIG. 19B provides a closer view of the timecard 1910, which is also displayed in the following figures.

Figure 20A:
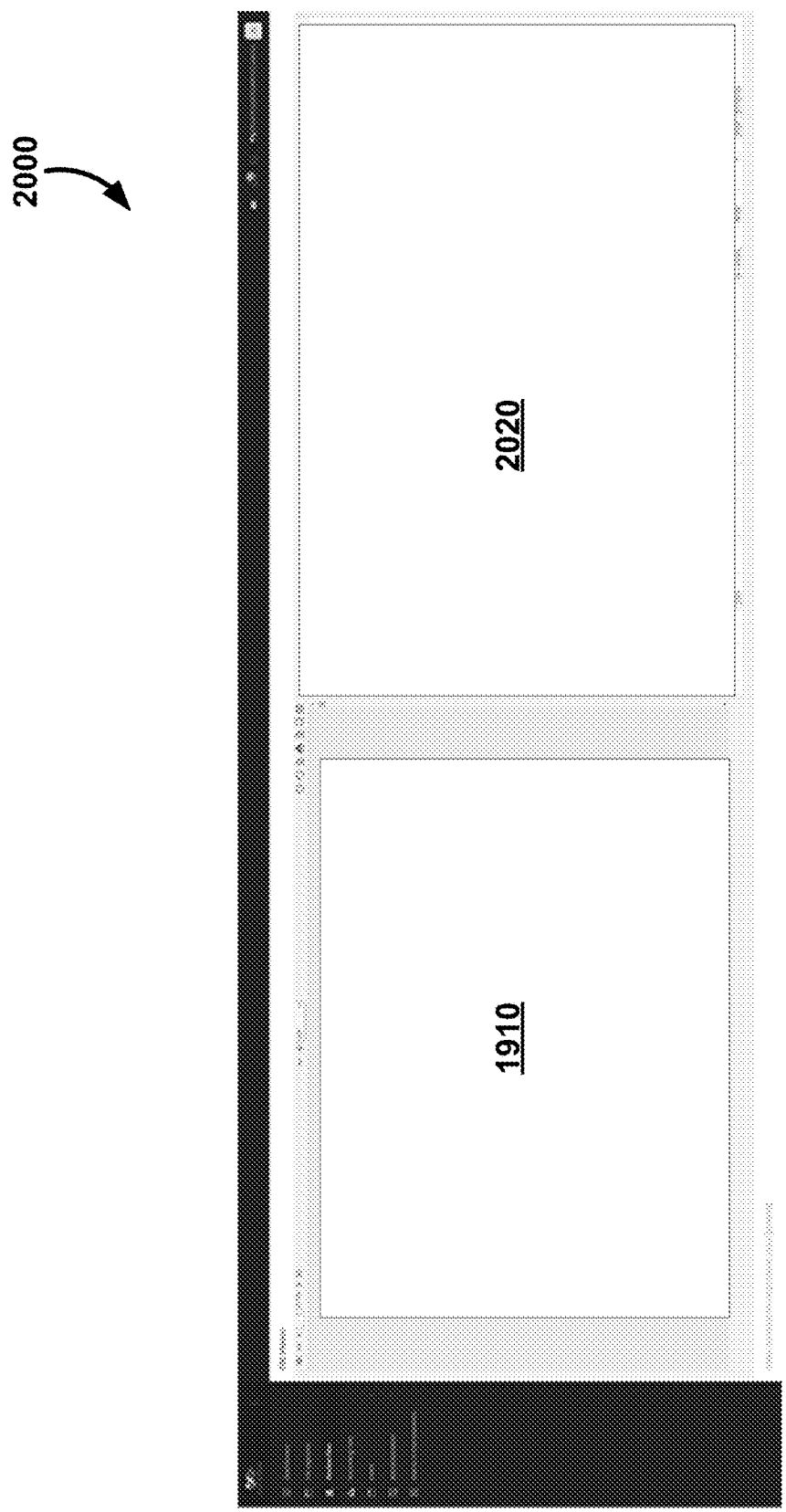
Figure 20B:
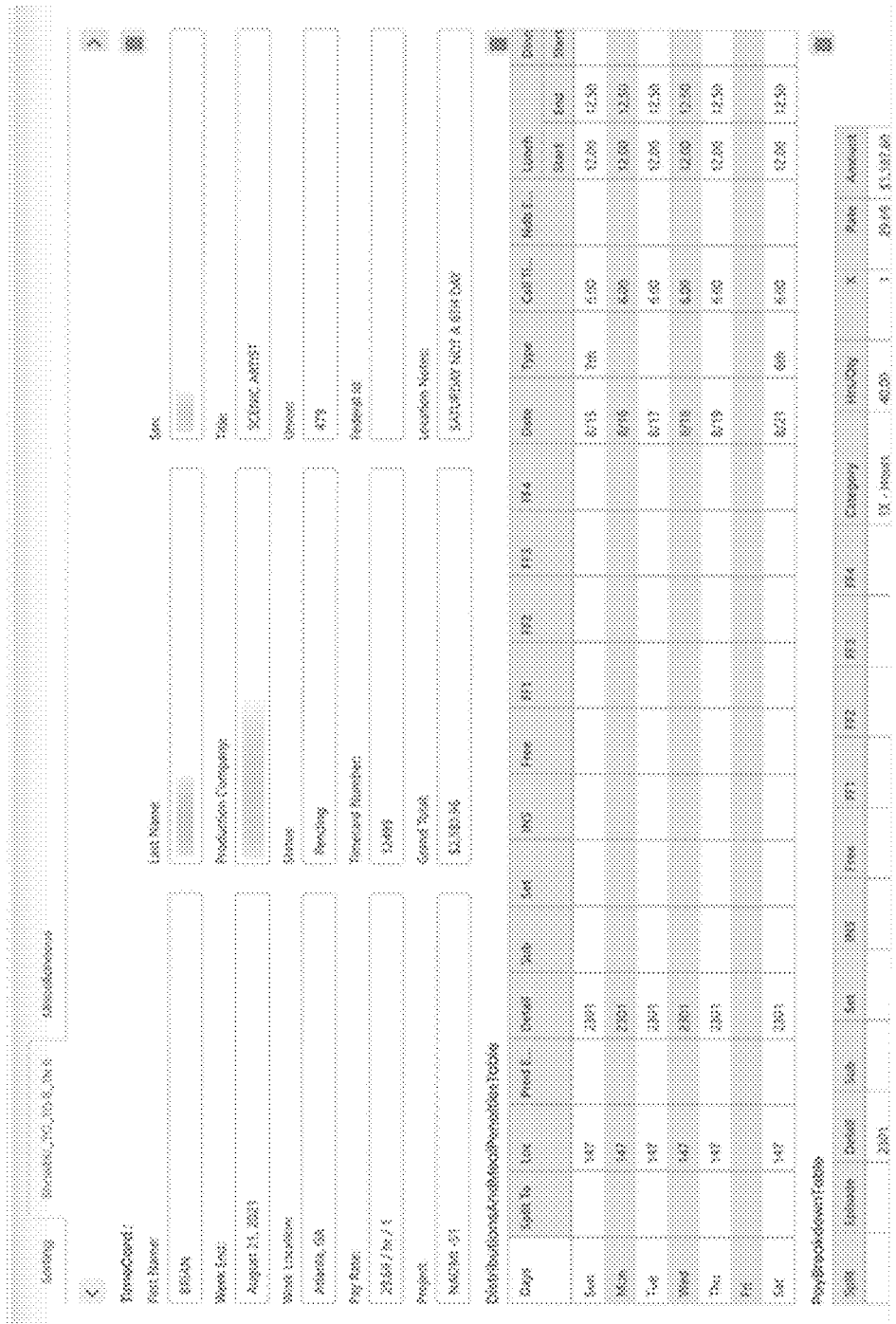

FIG. 20A provides an illustration 2000 of the document with the data extracted in a manner consistent with the processes disclosed previously. In this interface screenshot, the scanned timecard 1910 is displayed adjacent to the extracted data form 2020. This extraction is reviewable by the user, and data values may be manually updated if desired. The file may also be submitted for HTG processing and eventually payroll execution. FIG. 20B illustrates the extracted data screen 2020 in greater detail.

Figure 21A:
Figure 21B:
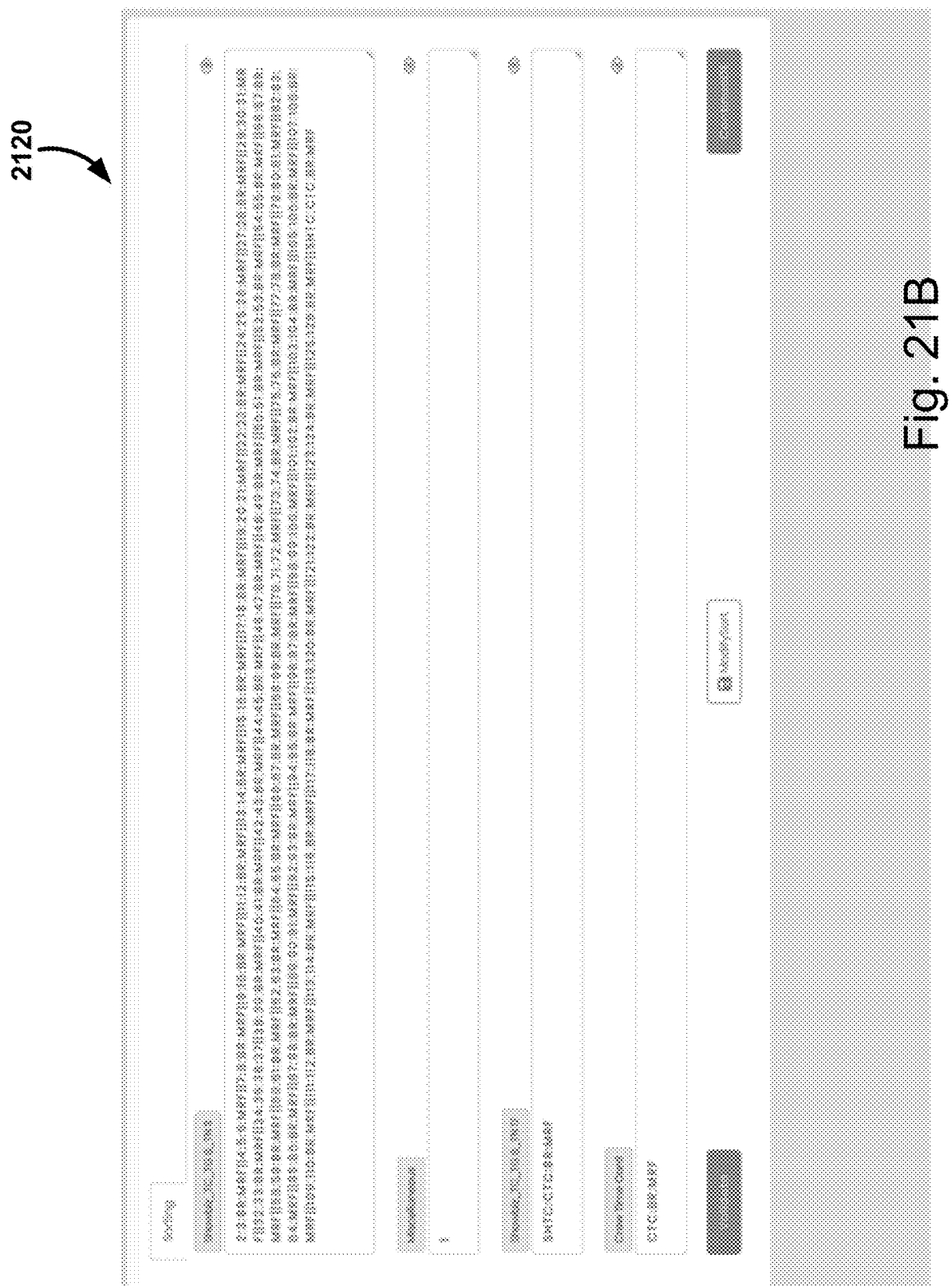

FIG. 21A provides an illustration 2100 of the sorting interface, whereby the scanned timecard 2010 is presented adjacent to a set of fields 2120 indicating how the timecards are stitched and sorted. The timecard 2010 illustrated may be the same as the one shown in FIG. 20B. FIG. 21B provides a closer view of the fields 2120 indicating how the timecards are stitched and sorted. In this figure, the reference to "Showbiz_TC_TG_6_Tn11" means the document is a Showbiz Timecard that belongs to Timecard group 6 and Template 16. This is just a grouping of one document, in other embodiments there will be similarly grouping other documents not just timecard. The reference to "2:3:BR: MRF" means page 2 and page 3 are the timecards that belong to the same person. "BR" means "Box Rental" which is an expected type of form with this package. When received, the term "BR" is replaced with the appropriate page number. Lastly, the term "MRF" refers to Mileage Record Form, which is the same principle as that of Box Rental.

Figure 22A:
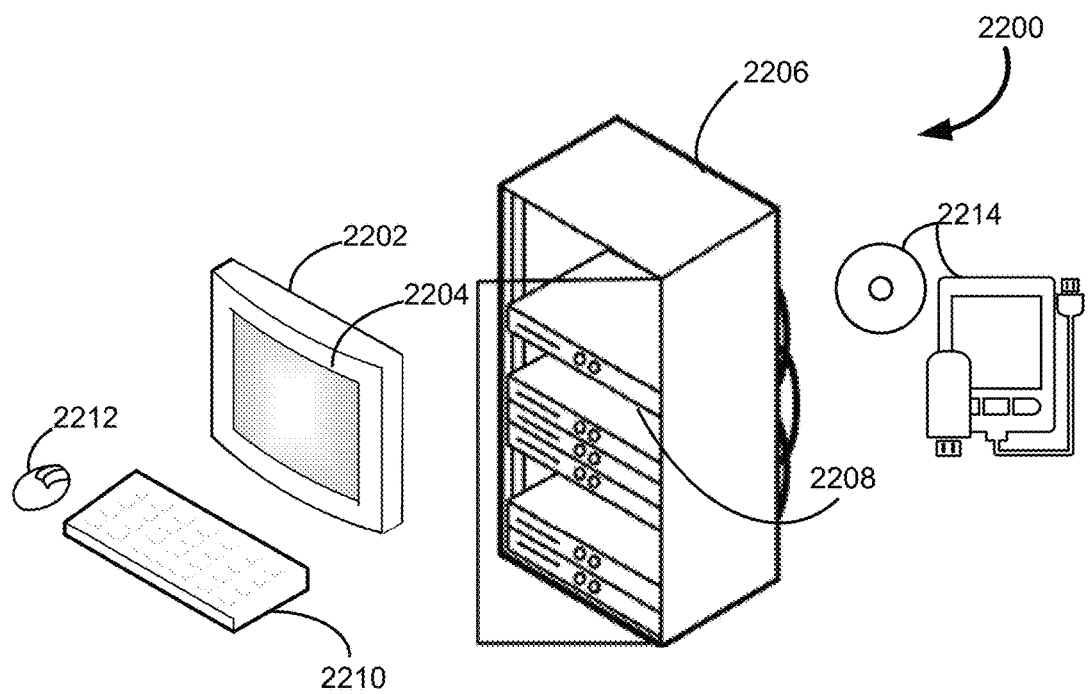
FIGS. 22A and 22B are illustrations of computer systems capable of implementing the cognitive training system, in accordance with some embodiments.
Figure 22B:
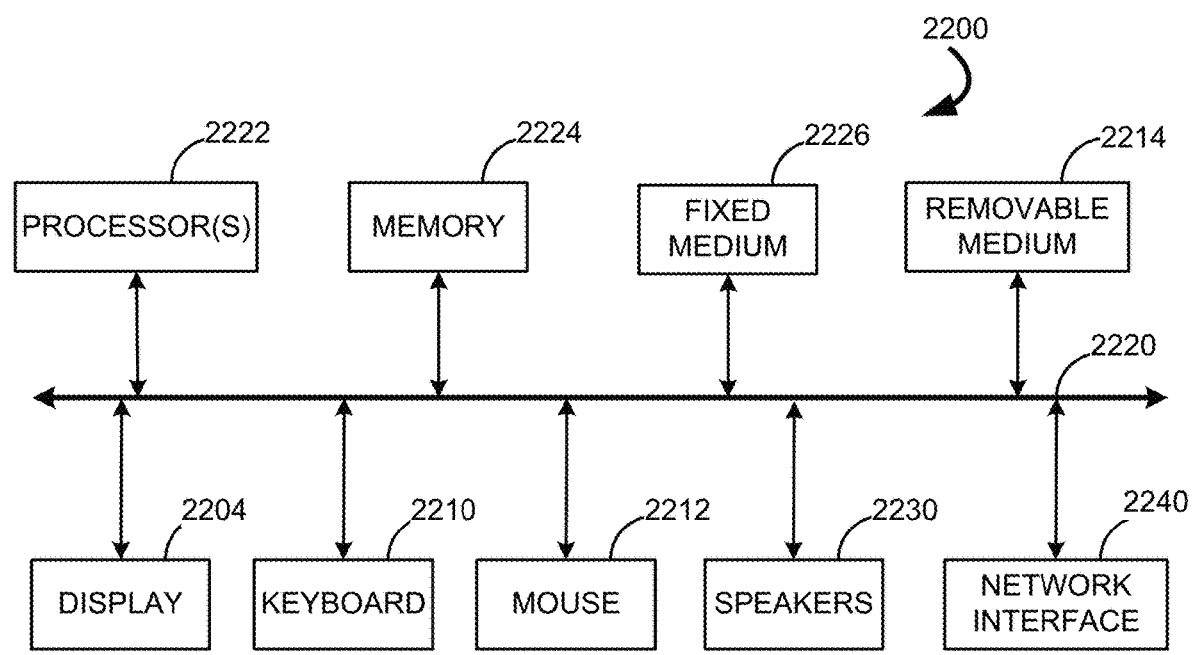

Now that the systems and methods for intelligent payroll management have been provided, attention shall now be focused upon apparatuses capable of executing the above functions in real-time. To facilitate this discussion, FIGS. 22A and 22B illustrate a Computer System 2200, which is suitable for implementing embodiments of the present invention. FIG. 22A shows one possible physical form of the Computer System 2200. Of course, the Computer System 2200 may have many physical forms ranging from a printed circuit board, an integrated circuit, and a small handheld device up to a huge super computer. Computer system 2200 may include a Monitor 2202, a Display 2204, a Housing 2206, server blades including one or more storage Drives 2208, a Keyboard 2210, and a Mouse 2212. Medium 2214 is a computer-readable medium used to transfer data to and from Computer System 2200.

FIG. 22B is an example of a block diagram for Computer System 2200. Attached to System Bus 2220 are a wide variety of subsystems. Processor(s) 2222 (also referred to as central processing units, or CPUs) are coupled to storage devices, including Memory 2224. Memory 2224 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable form of the computer-readable media described below. A Fixed Medium 2226 may also be coupled bi-directionally to the Processor 2222; it provides additional data storage capacity and may also include any of the computer-readable media described below. Fixed Medium 2226 may be used to store programs, data, and the like and is typically a secondary storage medium (such as a hard disk) that is slower than primary storage. It will be appreciated that the information retained within Fixed Medium 2226 may, in appropriate cases, be incorporated in standard fashion as virtual memory in Memory 2224. Removable Medium 2214 may take the form of any of the computer-readable media described below.

Processor 2222 is also coupled to a variety of input/output devices, such as Display 2204, Keyboard 2210, Mouse 2212 and Speakers 2230. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 2222 optionally may be coupled to another computer or telecommunications network using Network Interface 2240. With such a Network Interface 2240, it is contemplated that the Processor 2222 might receive information from the network, or might output information to the network in the course of performing the above-described intelligent payroll management. Furthermore, method embodiments of the present invention may execute solely upon Processor 2222 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 2200 can be controlled by operating system software that includes a file management system, such as a medium operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, Glasses with a processor, Headphones with a processor, Virtual Reality devices, a processor, distributed processors working together, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer (or distributed across computers), and when read and executed by one or more processing units or processors in a computer (or across computers), cause the computer(s) to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method for intelligent payroll management, the method comprising:
   ingesting a payroll document from a user;
   performing optical character recognition (OCR) on the document to generate at least one form;
   matching the at least one form to one of a plurality of form types;
   calibrating the at least one form by:
      identifying a keyword in the at least one form corresponding to the plurality of form types;
      resizing the at least one form by comparing the identified keyword size to an expected size;
      panning the at least one form based upon an expected coordinate of the identified keyword versus the identified keyword position;
   selecting a coordinate range based upon the form types;
   extracting data from the calibrated at least one form within the coordinate range for the data responsive to the matched form type as a JSON format;
   generating a standardized timecard for each calibrated at least one form using the extracted data;
   generating a packet of standardized timecards by stitching together each standardized timecard belonging to the user; and
   computing an hourly gross compensation for the user responsive to the packet.

2. The method of claim 1, wherein the payroll document includes multiple pages.

3. The method of claim 2, wherein each page has at least one form.

4. The method of claim 1, wherein the matching the form to one of the plurality of form types is by machine learning classification.

5. The method of claim 1, wherein the matching the form to one of the plurality of form types is by keyword disambiguation.

6. The method of claim 1, wherein the data extraction includes setting a known coordinate range in the form to a known data type, extracting the OCR results within the coordinate range, and codifying the extracted data with the known data type.

7. The method of claim 1, wherein the generating the packet of standardized timecards includes matching the forms by user's name using logic.

8. The method of claim 1, wherein computing the hourly gross compensation comprises:
   generating a constraint table based upon statutory constraints, union constraints and contractual constraints;
   selecting constraints to apply from the constraint table based upon specificity;
   applying the selected constraints to generate at least one hourly compensation; and
   summing the at least one hourly compensation for the packet of standardized timecards to generate the hourly gross compensation.

9. The method of claim 8, wherein the specificity is where a greatest number of attributes for the constraint match the extracted form data.

10. The method of claim 1, further comprising calculating net compensation, fringe benefits and taxes using the standardized timecards and the hourly gross compensation.

11. A computerized intelligent payroll management system comprising:
   an OCR engine for ingesting a payroll document from a user, and performing optical character recognition (OCR) on the document to generate at least one form;
   a data extractor for matching the at least one form to one of a plurality of form types, calibrating the at least one form by identifying a keyword in the at least one form corresponding to the plurality of form types, resizing the at least one form by comparing the identified keyword size to an expected size, and panning the at least one form based upon an expected coordinate of the identified keyword versus the identified keyword position, selecting a coordinate range based upon the form types, extracting data from the calibrated at least one form within the coordinate range for the data responsive to the matched form type as a JSON format, generating a standardized timecard for each calibrated at least one form using the extracted data, and generating a packet of standardized timecards by stitching together each standardized timecard belonging to the user; and a constraint manager for computing an hourly gross compensation for the user responsive to the packet.

12. The system of claim 11, wherein the payroll document includes multiple pages.

13. The system of claim 12, wherein each page has at least one form.

14. The system of claim 11, wherein the matching the form to one of the plurality of form types is by machine learning classification.

15. The system of claim 11, wherein the matching the form to one of the plurality of form types is by keyword disambiguation.

16. The system of claim 11, wherein the data extraction includes setting a known coordinate range in the form to a known data type, extracting the OCR results within the coordinate range, and codifying the extracted data with the known data type.

17. The system of claim 11, wherein the generating the packet of standardized timecards includes matching the forms by user's name using logic.

18. The system of claim 11, wherein computing the hourly gross compensation comprises:
   generating a constraint table based upon statutory constraints, union constraints and contractual constraints;
   selecting constraints to apply from the constraint table based upon specificity;
   applying the selected constraints to generate at least one hourly compensation; and
   summing the at least one hourly compensation for the packet of standardized timecards to generate the hourly gross compensation.

19. The system of claim 18, wherein the specificity is where a greatest number of attributes for the constraint match the extracted form data.

20. The system of claim 11, further comprising a payroll system for calculating net compensation, fringe benefits and taxes using the standardized timecards and the hourly gross compensation.

* * * * *